United States Patent
Kurihara

(10) Patent No.: US 9,707,636 B2
(45) Date of Patent: Jul. 18, 2017

(54) WIRE ELECTRICAL DISCHARGE MACHINING APPARATUS, WIRE ELECTRICAL DISCHARGE MACHINING SYSTEM, POWER SUPPLY APPARATUS, WIRE ELECTRICAL DISCHARGE MACHINING METHOD, AND METHOD OF MANUFACTURING SEMICONDUCTOR SUBSTRATE

(71) Applicants: CANON MARKETING JAPAN KABUSHIKI KAISHA, Minato-ku, Tokyo (JP); KABUSHIKI KAISHA MAKINO HURAISU SEISAKUSHO, Meguro-ku, Tokyo (JP)

(72) Inventor: Haruya Kurihara, Sagamihara (JP)

(73) Assignees: CANON MARKETING JAPAN KABUSHIKI KAISHA, Tokyo (JP); KABUSHIKI KAISHA MAKINO KURAISU SEISAKUSHO, Tokyo (JP)

( * ) Notice: Subject to any disclaimer, the term of this patent is extended or adjusted under 35 U.S.C. 154(b) by 423 days.

(21) Appl. No.: 14/316,584

(22) Filed: Jun. 26, 2014

(65) Prior Publication Data
US 2015/0001182 A1   Jan. 1, 2015

(30) Foreign Application Priority Data

Jun. 28, 2013 (JP) .................. 2013-135720
Mar. 25, 2014 (JP) .................. 2014-061434

(51) Int. Cl.
*B23H 7/04*   (2006.01)
*B23H 1/02*   (2006.01)
*B23H 9/00*   (2006.01)

(52) U.S. Cl.
CPC ............. *B23H 1/028* (2013.01); *B23H 9/00* (2013.01); *B23H 1/02* (2013.01)

(58) Field of Classification Search
CPC ... B23H 7/04; B23H 1/02; B23H 9/00; B23H 1/028
(Continued)

(56) References Cited

U.S. PATENT DOCUMENTS

| 8,188,401 B2 | 5/2012 | Sato |
| 2011/0114603 A1* | 5/2011 | Mai .................. B23H 1/028 219/69.12 |

(Continued)

FOREIGN PATENT DOCUMENTS

| CN | 1968780 A | 5/2007 |
| CN | 102339035 A | 2/2012 |

(Continued)

OTHER PUBLICATIONS

Taiwan Office Action dated Jun. 6, 2016 in counterpart TW application No. 103122282.

(Continued)

*Primary Examiner* — Thien S Tran
(74) *Attorney, Agent, or Firm* — Canon USA, Inc. IP Division

(57) ABSTRACT

A wire electrical discharge machining apparatus includes: multiple main rollers around which a wire winds in parallel; multiple workpiece feeding units for feeding the workpiece toward the wire; a machining power supply unit for supplying a machining voltage to the workpiece; and a power supply terminal for supplying the machining voltage to the wire. The multiple workpiece feeding units are respectively arranged at a first position for feeding the workpiece toward a wire portion having a wire plane of the wire and a second position for feeding another workpiece toward another wire portion having another wire plane of the wire. The power supply terminal is arranged at a third position between the first position and the second position. The machining voltage (Continued)

supplied from the single machining power supply unit is supplied to the workpieces to be electrically discharge machined by the multiple workpiece feeding units.

11 Claims, 26 Drawing Sheets

(58) Field of Classification Search
USPC ....... 125/13.01, 16.01, 16.02, 21; 219/69.12, 219/69.13, 69.17, 69.18, 137 PS
See application file for complete search history.

(56) References Cited

U.S. PATENT DOCUMENTS

| 2012/0152906 | A1 | 6/2012 | Sato | |
| 2012/0298091 | A1* | 11/2012 | Hoshiyama | B23D 57/0069 |
| | | | | 125/16.02 |
| 2013/0043217 | A1* | 2/2013 | Yuzawa | B23H 7/02 |
| | | | | 219/69.12 |

FOREIGN PATENT DOCUMENTS

| JP | S54-6186 A | 1/1979 | |
| JP | S55-131436 A | 10/1980 | |
| JP | 2010005735 A | 1/2010 | |
| JP | WO 2011145390 A1 * | 11/2011 | ............... B23H 7/02 |
| JP | 2012045633 A | 3/2012 | |
| JP | 2012-200802 A | 10/2012 | |
| TW | 201228756 A | 7/2012 | |
| WO | 2011/145390 A1 | 11/2011 | |

OTHER PUBLICATIONS

JP OA dated May 12, 2015 for JP Patent Application No. 2014-061434, pp. 1-4.

First Office Action in counterpart CN Appl. No. 201410302212.5 dated Feb. 22, 2016.

* cited by examiner

MULTI-WIRE ELECTRICAL DISCHARGE MACHINING APPARATUS
(FRONT VIEW)

ENLARGED VIEW OF POWER SUPPLY TERMINAL
(SIDE VIEW)

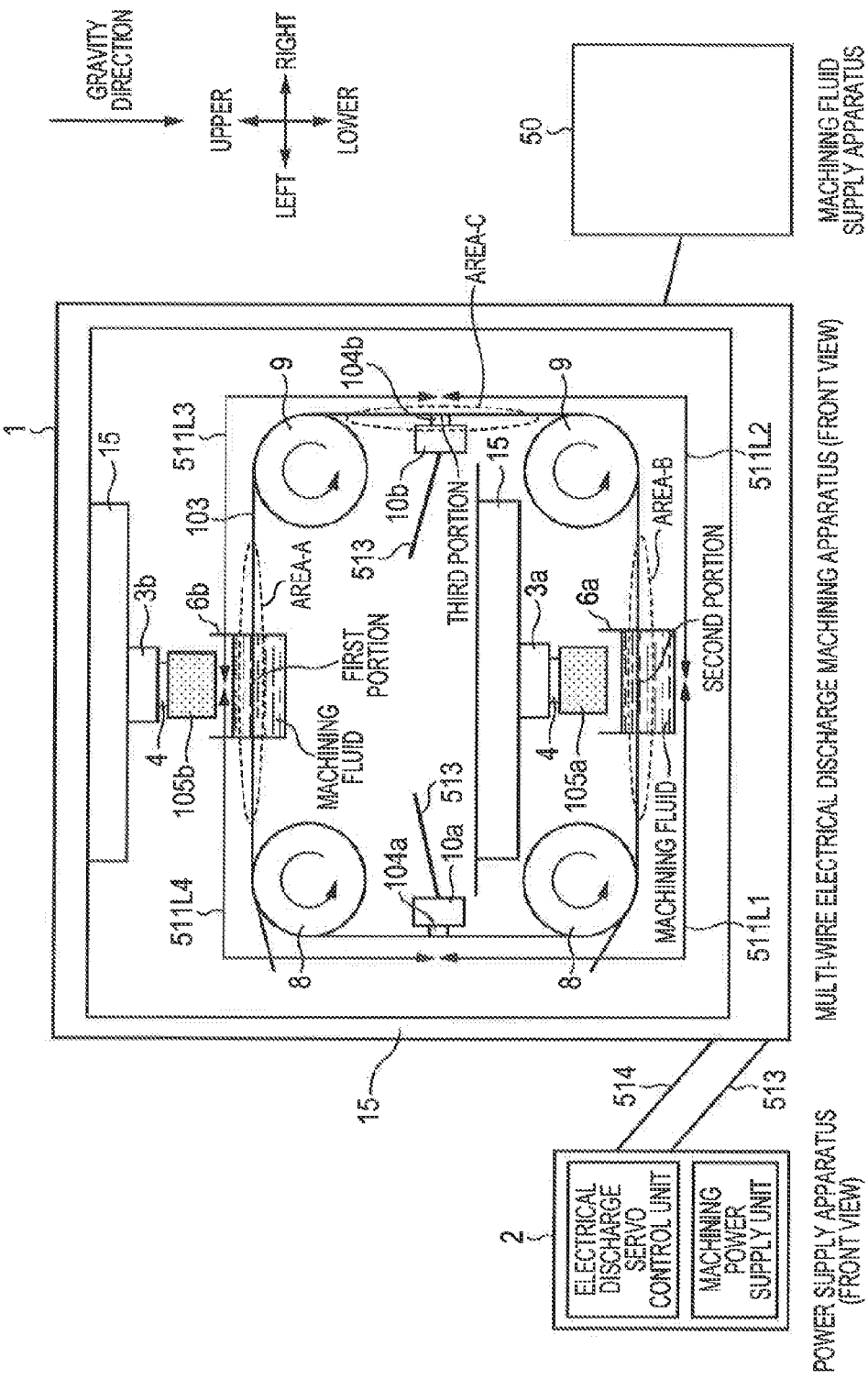

WIRE ELECTRICAL DISCHARGE MACHINING APPARATUS, WIRE ELECTRICAL DISCHARGE MACHINING SYSTEM, POWER SUPPLY APPARATUS, WIRE ELECTRICAL DISCHARGE MACHINING METHOD, AND METHOD OF MANUFACTURING SEMICONDUCTOR SUBSTRATE

BACKGROUND OF THE INVENTION

Field of the Invention

The present invention relates to a wire electrical discharge machining apparatus, a wire electrical discharge machining system, a power supply apparatus, a wire electrical discharge machining method, and a method of manufacturing a semiconductor substrate.

Description of the Related Art

Hitherto, a wire saw is known as an apparatus for cutting a silicon ingot into multiple thin slices. In recent years, there is a technology for cutting a workpiece into thin slices by using a wire electrical discharge machining technology. For instance, Japanese Patent Application Laid-Open No. 2012-200802 discloses a technology for machining multiple ingots by using a multi-wire electrical discharge machining apparatus.

Japanese Patent Application Laid-Open No. 2012-200802 discloses a technology in which rotating electrodes and two ingots are arranged alternately so that distances between three rotating electrodes and centers of two cutting wires are equal to each other, and two machining voltages are applied individually to the ingots in order to supply a uniform electrical discharge machining current to the individual ingots.

With this apparatus structure, it is possible to realize the uniform machining current flowing in a direction to the two ingots at a shortest distance from the electrodes. However, a machining current also flows around from each electrode to a far side between the electrodes, i.e., the current also flows in the opposite direction. Therefore, a machining current that does not contribute to the cutting of the two ingots flows in the wire.

Further, in Japanese Patent Application Laid-Open No. 2012-200802, when the wire electrical discharge machining of two ingots is performed as a batch process, because the machining voltage is set individually for each ingot, the machining voltage and a feeding amount of a workpiece can be controlled individually for each ingot. However, the number of control units for applying machining voltages to the two ingots is increased, and hence the control units are complicated, resulting in an increase of apparatus cost.

SUMMARY OF THE INVENTION

Therefore, it is an object of the present invention to provide a mechanism for enabling wire electrical discharge machining of multiple workpieces to be performed as a batch process in low cost by utilizing two electrical discharge machining currents flowing in opposite directions with respect to one power supply terminal in one turn of a wire winding around multiple main rollers.

In order to achieve the object of the present invention, according to one embodiment of the present invention, there is provided a wire electrical discharge machining apparatus for electrical discharge machining of a workpiece, including: multiple main rollers around which a wire winds in parallel; multiple workpiece feeding units configured to feed the workpiece toward the wire winding around the multiple main rollers; a machining power supply unit configured to supply a machining voltage to the workpiece; and a power supply terminal configured to supply the machining voltage to the wire winding around the multiple main rollers. The multiple workpiece feeding units are respectively arranged at a first position for feeding the workpiece toward a wire portion having a wire plane of the wire winding around the multiple main rollers in parallel and a second position for feeding the workpiece toward another wire portion having another wire plane of the wire winding around the multiple main rollers in parallel. The power supply terminal is arranged at a third position between the first position and the second position, at which the wire winds around the multiple main rollers in parallel. The machining voltage is supplied from the single machining power supply unit to the workpieces to be electrically discharge machined by the multiple workpiece feeding units.

Further features of the present invention will become apparent from the following description of exemplary embodiments with reference to the attached drawings.

BRIEF DESCRIPTION OF THE DRAWINGS

FIG. 16A is a front view of a multi-wire electrical discharge machining system for simultaneous machining of multiple workpieces according to the present invention.

DESCRIPTION OF THE EMBODIMENTS

Preferred embodiments of the present invention will now be described in detail in accordance with the accompanying drawings.

Figure 1:
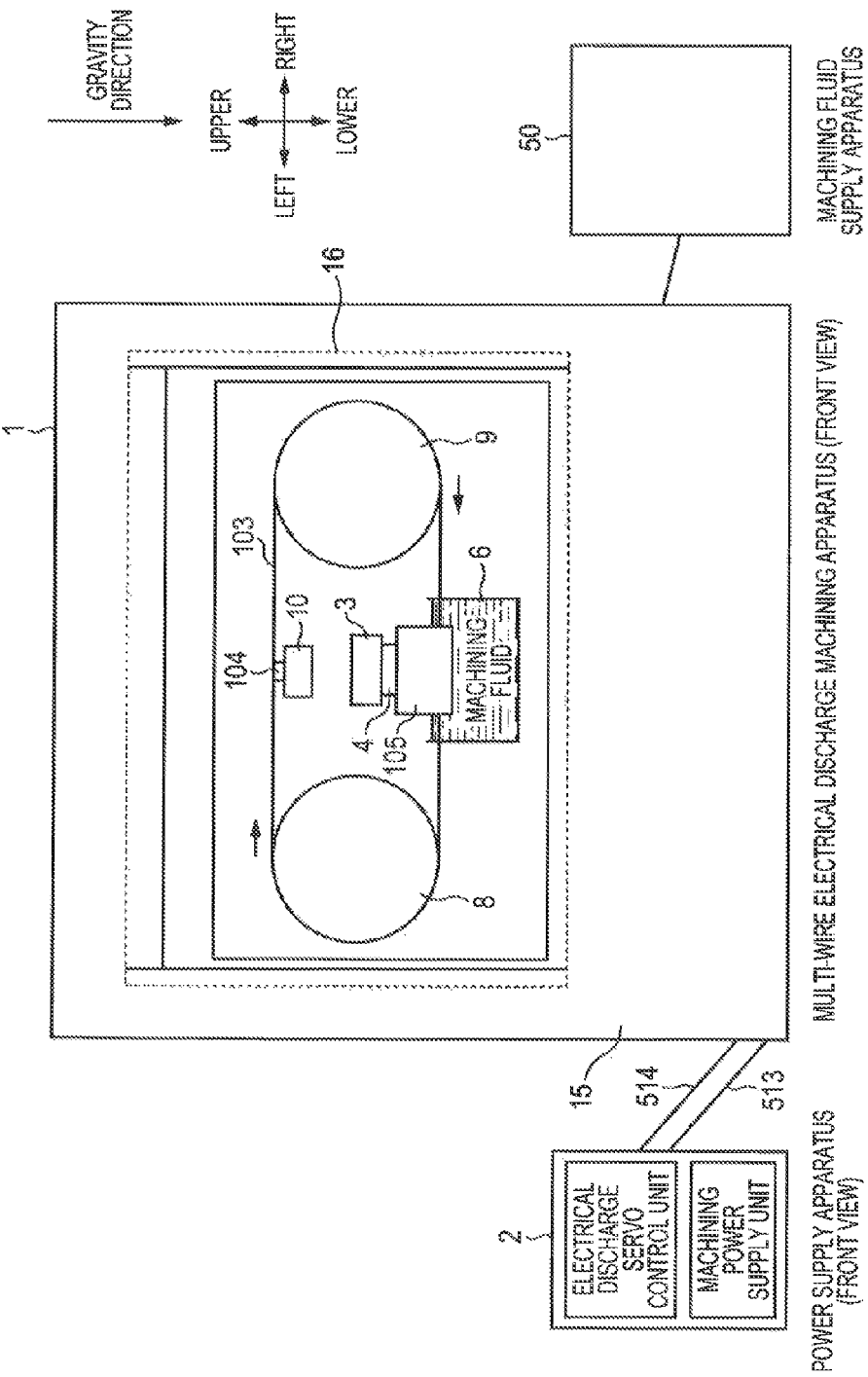
FIG. 1 is a front view of a multi-wire electrical discharge machining system according to the present invention.

FIG. 1 is referred to for description. FIG. 1 is an external view of a multi-wire electrical discharge machining apparatus 1 viewed from front according to an embodiment of the present invention. It should be understood that the structure of mechanisms illustrated in FIG. 1 is an example, and there are various structural examples in accordance with objects and usages.

FIG. 1 illustrates a structure of a multi-wire electrical discharge machining system (a manufacturing system for semiconductor substrates or solar cell substrates) according to the present invention. The multi-wire electrical discharge machining system includes a multi-wire electrical discharge machining apparatus 1, a power supply apparatus 2, and a machining fluid supply apparatus 50. The multi-wire electrical discharge machining system can cut a workpiece into thin slices by electrical discharge at an interval of multiple wires arranged in parallel.

In the multi-wire electrical discharge machining apparatus 1, a workpiece feeding unit 3 driven by a servo motor is arranged above wires 103, and the workpiece 105 can be moved in up and down directions. In the present invention, the workpiece 105 is fed downward (in the gravity direction), and electrical discharge machining is performed between the workpiece 105 and the wire 103. In this specification, the up and down directions correspond to upward and downward directions in the gravity direction, respectively, and left and right directions correspond to leftward and rightward directions, respectively, when the multi-wire electrical discharge machining apparatus is viewed from the front.

In the power supply apparatus 2, an electrical discharge servo control circuit configured to control the servo motor controls an electrical discharge gap to be constant in order to efficiently generate electrical discharge in accordance with an electrical discharge state, and performs positioning of the workpiece so that the electrical discharge machining is proceeded.

A machining power supply circuit (illustrated in FIG. 7) applies an electrical discharge pulse for the electrical discharge machining to the wire 103, performs control for adapting to a state such as a short circuit occurring in the electrical discharge gap, and supplies the electrical discharge servo control circuit with an electrical discharge gap signal.

The machining fluid supply apparatus 50 supplies the workpiece 105 and the wire 103 with machining fluid necessary for cooling an electrical discharge machining portion and for removing machining chips (scraps) by a pump, removes the machining chip in the machining fluid, controls an electrical conductivity (1 µS/cm to 250 µS/cm) by ion exchange, and controls liquid temperature (at around 20° C.). Water is mainly used, but it is possible to use electrical discharge machining oil.

In main rollers 8 and 9, a predetermined number of grooves are formed at a predetermined pitch so that the workpieces can be cut so as to have a desired thickness. A tension-controlled wire supplied from a wire supply bobbin winds around the two main rollers a necessary number of turns and is sent to a rewind bobbin. The wire speed is approximately 100 m/min to 900 m/min. The two main rollers rotate together in the same direction at the same speed, and one wire 103 sent from a wire feeding portion winds around outer peripheries of the (two) main rollers so as to drive the multiple wires 103 arranged in parallel to run in the same direction, i.e., the main rollers can operate as a wire driving unit.

Figure 8:
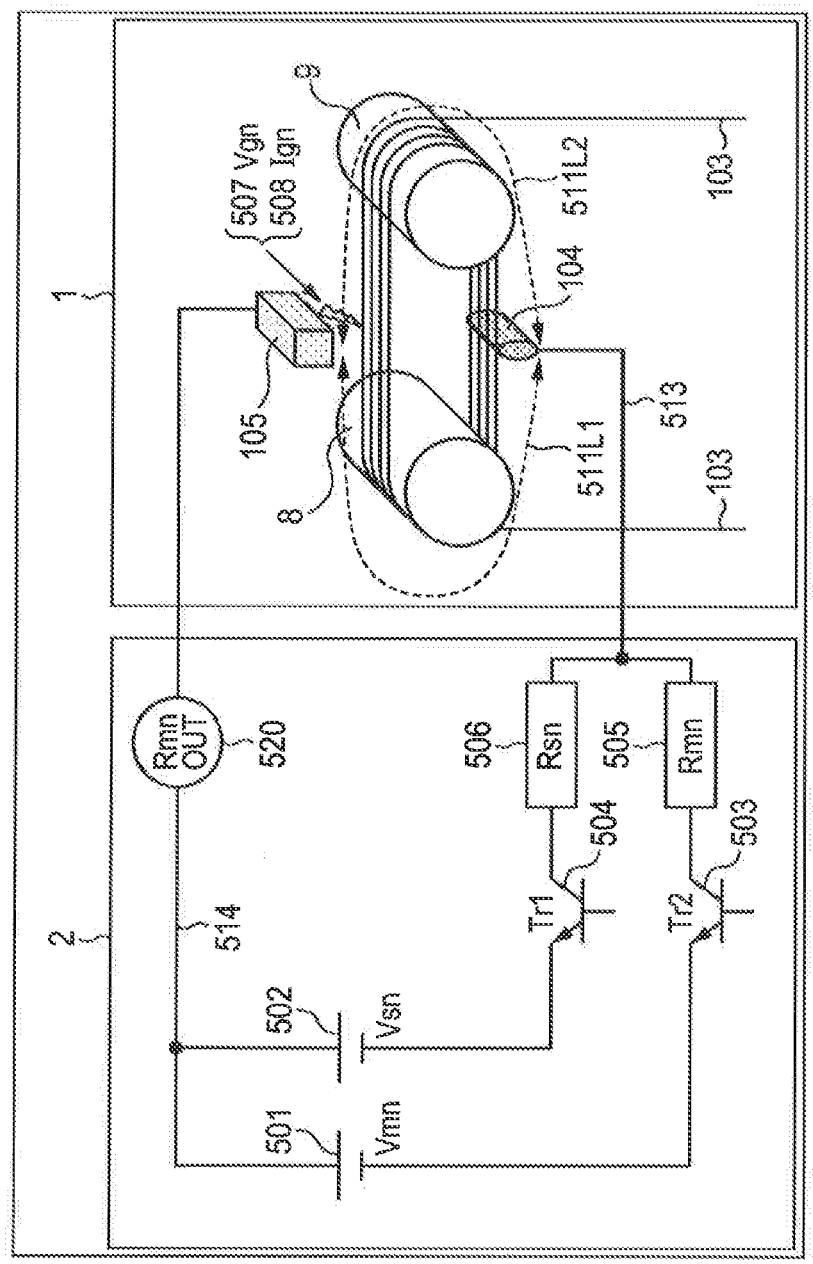
FIG. 8 illustrates a layout of an electric circuit and various components according to the present invention.

As illustrated in FIG. 8, the wire 103 as one continuous wire is sent out from a bobbin (not shown), fits in guide grooves (not shown) on the outer circumferential surfaces of the main rollers so as to wind around the outer circumferential surfaces of the main rollers multiple turns (approximately 2,000 turns at most) in a spiral manner, and then is rewound by the bobbin (not shown).

The multi-wire electrical discharge machining apparatus 1 is connected to the power supply apparatus 2 via electric wires 513 and 514 and operates by power supplied from the power supply apparatus 2.

As illustrated in FIG. 1, the multi-wire electrical discharge machining apparatus 1 includes a block functioning as a base of the multi-wire electrical discharge machining apparatus 1, and also includes, in the part above the block 15, the workpiece feeding unit 3, a bonding portion 4, the workpiece 105, a machining fluid vessel 6, the main roller 8, the wire 103, the main roller 9, a power feed unit 10, and a power supply terminal 104.

Figure 2:
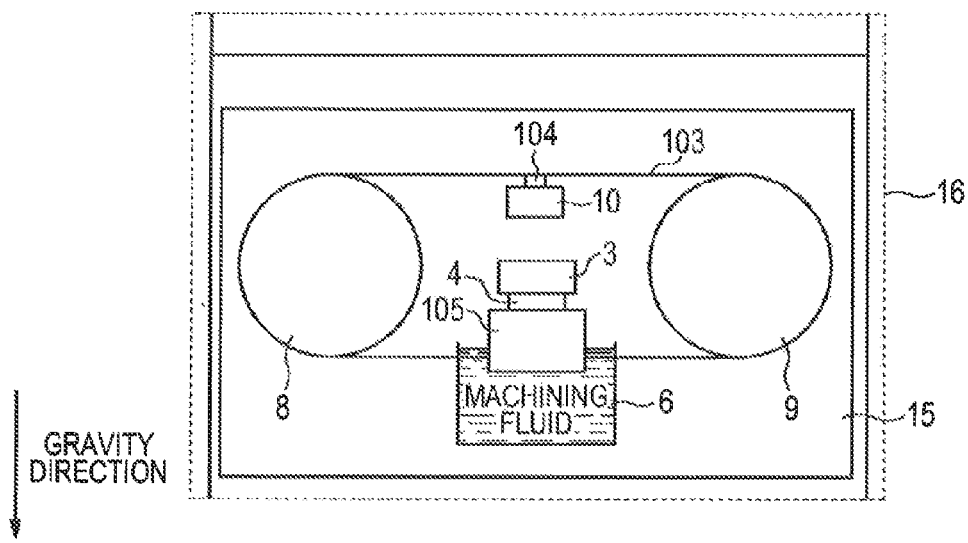
FIG. 2 is an enlarged front view of a multi-wire electrical discharge machining apparatus according to the present invention.

FIG. 2 is referred to for description. FIG. 2 is an enlarged view of a part in a dotted line frame 16 illustrated in FIG. 1.

The wire 103 winds around the main rollers 8 and 9 multiple turns so that the wires 103 are arranged at a predetermined pitch in accordance with the grooves formed on the main rollers. The main roller has a structure including a metal core and a resin covering the core.

Between two main rollers and at a position above substantially the center of a space between the main rollers 8 and 9, the power supply terminal 104 mounted to the power feed unit 10 is arranged. The power supply terminal 104 has an upper exposed surface, which contacts with the wire so that a machining voltage is applied to the multiple running wires 103 in a batch.

Figure 3:
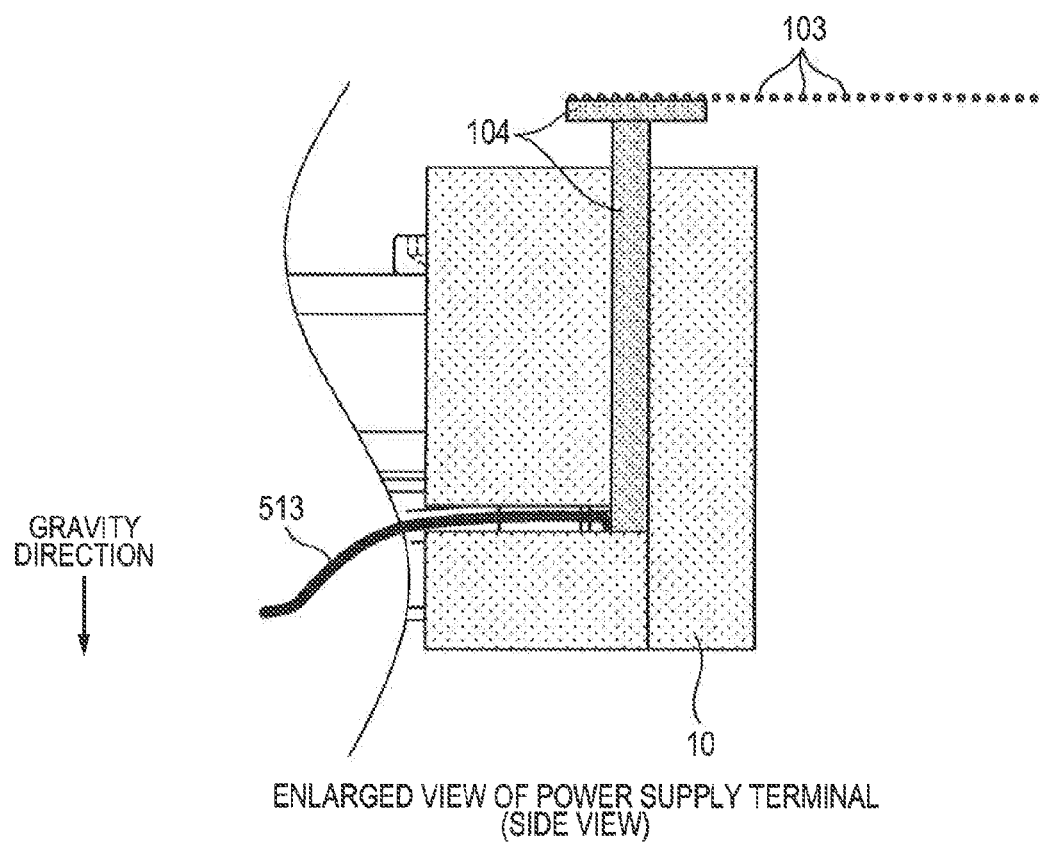
FIG. 3 is a side view illustrating positional relationship between a power supply terminal and wires in the present invention.
Figure 6:
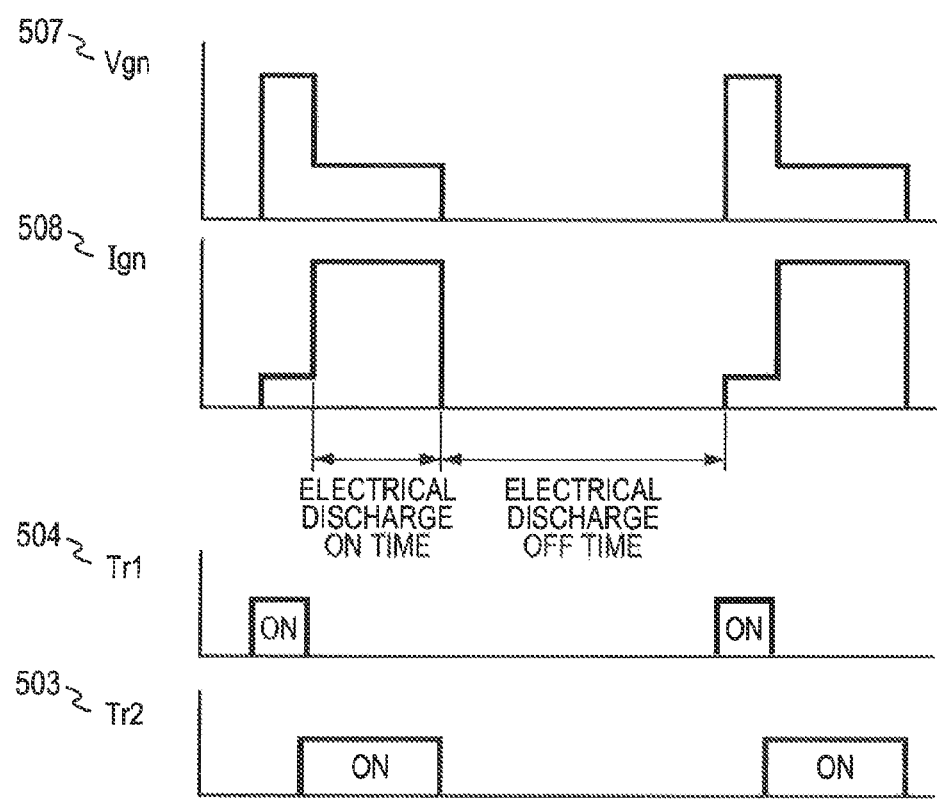
FIG. 6 shows an interelectrode state (voltage and current) and a pulse (ON/OFF) period of a machining voltage according to the present invention.

As illustrated in FIG. 3, the power supply terminal 104 contacts with ten of the wires 103 so as to supply an electrical discharge pulse (an electrical discharge pulse of a transistor tr2 503 illustrated in FIG. 6) from the machining power supply unit to the ten wires. The power supply terminal 104 is arranged at such a position that wire lengths from both ends of the workpiece 105 in the longer direction of the wire are substantially equal to each other (511L1=511L2 illustrated in FIG. 8). The power supply terminal 104 is required to have high resistance to mechanical wear and electric conductivity, and is made of cemented carbide alloy.

Between two main rollers and at a position below substantially the center of the space between the main rollers 8 and 9, the workpiece 105 mounted to the workpiece feeding unit 3 is arranged. When the workpiece feeding unit 3 feeds the workpiece 105 downward, a slicing process is performed.

Below the main rollers, the machining fluid vessel 6 is arranged, in which the wire 103 and the workpiece 105 are dipped to cool the electrical discharge machining portion and remove machining chips. The machining fluid vessel 6 is filled with machining fluid in which the fed workpiece is dipped.

FIG. 3 illustrates one power supply terminal 104 contacting with ten wires 104. However, it should be understood that the number of wires contacting with one power supply terminal and the number of power supply terminals can be changed as necessary.

The block 15 is joined to the workpiece feeding unit 3. In addition, the workpiece feeding unit 3 is bonded (joined) to the workpiece 105 via the bonding portion 4.

In this embodiment, a silicon ingot is exemplified as a material to be machined (the workpiece 105).

The bonding portion 4 can be anything for adhering (joining) the workpiece feeding unit 3 and the workpiece 105. For instance, a conductive adhesive is used.

The workpiece feeding unit 3 is an apparatus including a mechanism for moving the workpiece 105 adhered (joined) with the bonding portion 4 in the up and down direction. When the workpiece feeding unit 3 holding the workpiece 105 moves downward (in the gravity direction), the workpiece 105 can approach the wire 103. The workpiece feeding unit 3 is arranged at a lower position than the power supply terminal 104. The workpiece feeding unit 3 feeds the workpiece 105 in such a direction that the workpiece 105 approaches the wire winding around the main rollers 8 and 9 so that the workpiece 105 held by the workpiece feeding unit 3 is dipped in the machining fluid.

The machining fluid vessel 6 is a container filled with the machining fluid and is arranged outside the wire winding around the multiple main rollers 8 and 9. The machining fluid is deionized water having a high resistance value, for example. The machining fluid is provided between the wire 103 and the workpiece 105. The electrical discharge occurs between the wire 103 and the workpiece 105 so that the workpiece 105 can be cut.

The main rollers 8 and 9 are provided with multiple rows of grooves for winding the wire 103, and wire 103 winds around the rollers 8 and 9 along the grooves. When the main rollers 8 and 9 rotate in a left or right direction, the wire 103 runs. In addition, as illustrated in FIG. 2, the wire 103 winds around the main rollers 8 and 9 so as to form wire rows on the upper side and the lower side of the main rollers 8 and 9.

In addition, the wire 103 is a conductor. When the power supply terminal 104 of the power feed unit 10 supplied with a voltage from the power supply apparatus 2 contacts with the wire 103, the supplied voltage is applied from the power supply terminal 104 to the wire 103. In other words, the power supply terminal 104 applies the voltage to the wire 103.

Then, an electric discharge occurs between the wire 103 and the workpiece 105 so as to cut the workpiece 105 (as electrical discharge machining), and hence thin silicon plates (silicon wafers) can be produced.

FIG. 3 is referred to for description. FIG. 3 is an enlarged view of the power supply terminal 104.

The power supply terminal 104 (one terminal) contacts with the wires 103 (ten wires). An interval between the wires 103 (wire pitch) is approximately 0.3 mm.

Figure 4:
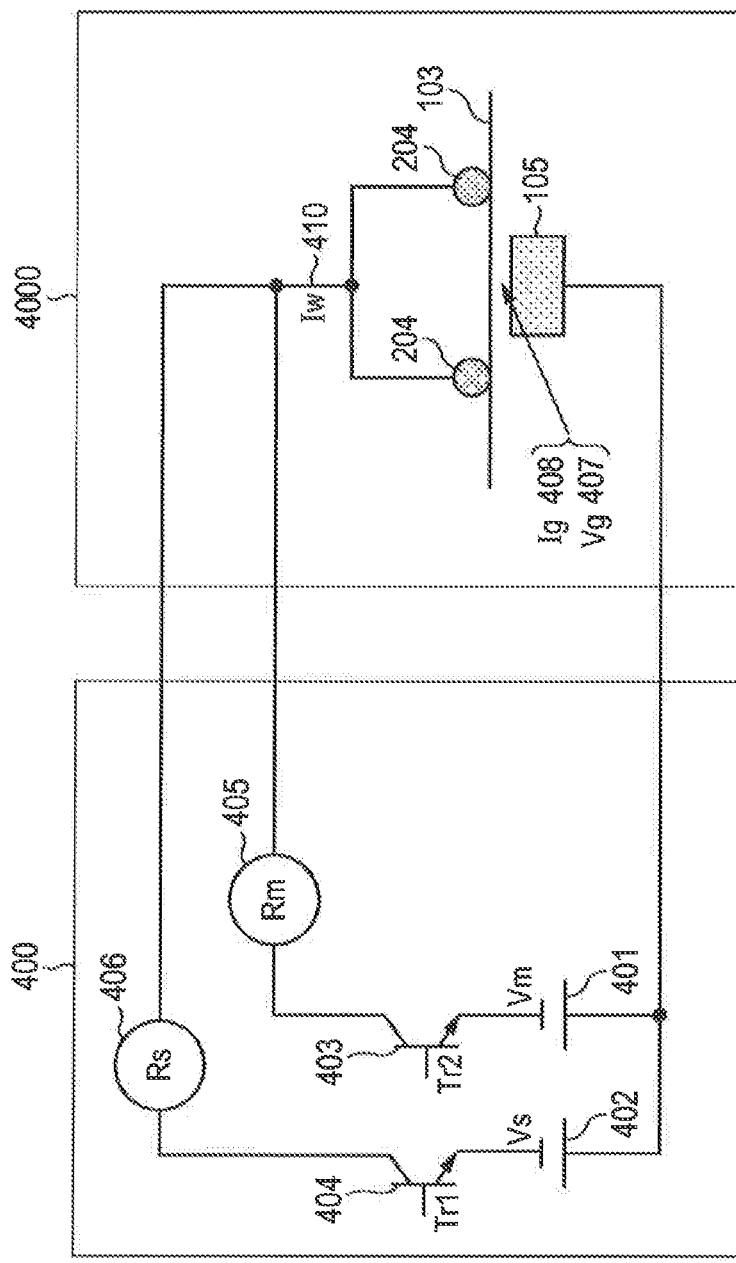
FIG. 4 illustrates a layout of an electric circuit and various components of a single-wire electrical discharge machining system according to related art.

FIG. 4 is referred to for description. FIG. 4 illustrates a wire electrical discharge machining apparatus 4000 and an electric circuit 400 of an individual power supply method as a related-art method, in which the machining voltage is individually supplied to the wires.

A machining power supply unit 401 supplies a machining voltage Vm. Here, Vm is a machining voltage set to supply a current necessary for the electrical discharge machining. The machining voltage Vm can be set to an arbitrary voltage from 60 V to 150 V.

A machining power supply unit 402 applies an inducing voltage Vs. Here, Vs is an inducing voltage set to induce the electrical discharge. Further, the machining power supply unit 402 is also used for monitoring a state of voltage (electrical discharge current) at an interelectrode or an interelectrode space between the wire 103 and the workpiece 105. The inducing voltage Vs can be set to an arbitrary voltage from 60 V to 300 V.

A transistor (Tr2) 403 switches between an ON (conductive) state and an OFF (nonconductive) state of the machining voltage Vm. A transistor (Tr1) 404 switches between an ON (conductive) state and an OFF (nonconductive) state of the inducing voltage Vs.

By setting a fixed resistance value Rm 405 by using a current limiting resistor, a wire current (Iw) and an electrical discharge current (Ig) at the interelectrode of each wire are limited. The resistance Rm can be set to an arbitrary value from 1Ω to 100Ω. In other words, supposing that Vm=60 V (volts), Vg=30 V, and Rm=10Ω are set, then Iw (Ig)=(60 V−30 V)/10 Ω=3 A (ampere) is satisfied.

In the calculation equation given above, a voltage drop from the machining voltage (Vm) to a power supplying point (power supply terminal) is supposed to be 30 V. However, a voltage drop from the power supplying point to an electrical discharge point due to a wire resistance (Rw) is not considered.

In other words, in the individual power supply method as the related-art method, a value of the machining current Iw is determined by the resistance Rm of the current limiting resistor. Therefore, in order to obtain a desired wire current and an electrical discharge current (Ig) of each wire, the wire resistance Rw is set to satisfy the relationship of Rm>Rw.

By setting a fixed resistance value Rs 406 by using a current limiting resistor, an inducing current for inducing the electrical discharge is limited. The resistance Rs can be set to an arbitrary value from 1Ω to 100Ω.

The electrical discharge voltage (Vg) 407 is an electrical discharge voltage at the interelectrode applied between the wire 103 and the workpiece 105 (applied to the interelectrode) during the electrical discharge. An electrical discharge current (Ig) 408 is an electrical discharge current at the interelectrode flowing between the wire 103 and the workpiece 105 during the electrical discharge. A machining current (Iw) 410 is a machining current supplied to each wire.

Figure 5:
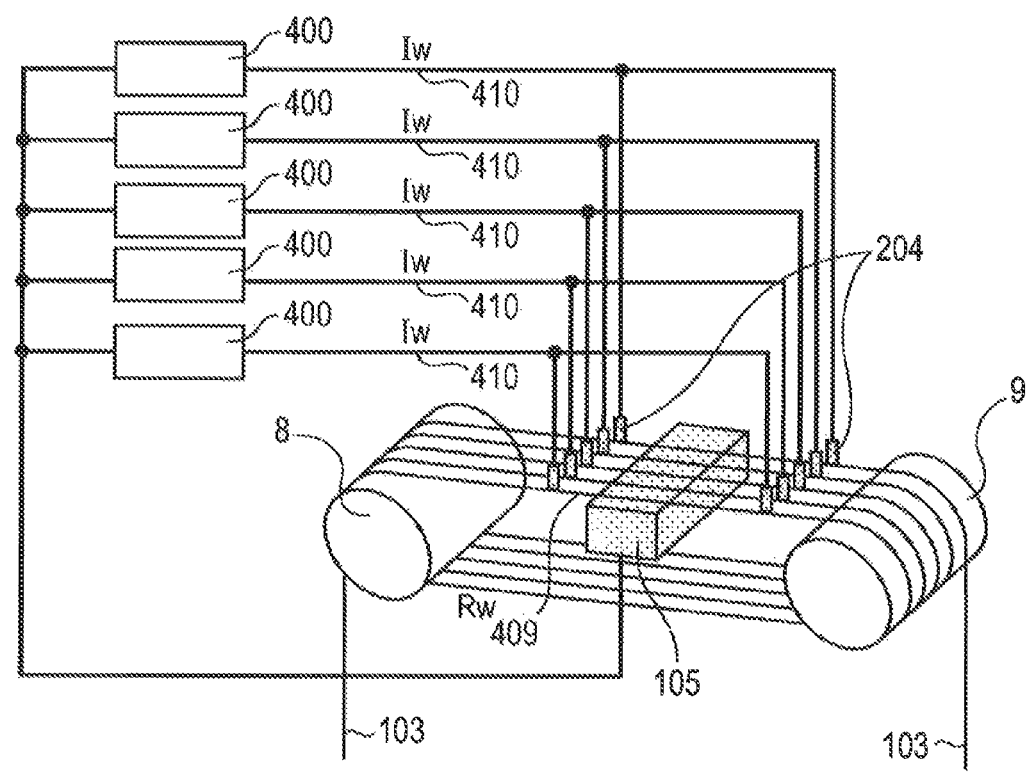
FIG. 5 illustrates a layout of an electric circuit and various components of a multi-wire electrical discharge machining system according to related art.

FIG. 5 is referred to for description. FIG. 5 illustrates that the electric circuits 400 supply power to multiple wires with the individual power supply method as the related-art method, in which the machining voltage is individually supplied to the wires.

A wire resistance (Rw) 409 indicates a resistance of each wire. Individual power supply terminals 204 arranged at two positions near both ends of the workpiece 105 in the longer direction of the wire apply pulses of the machining voltage, so as to perform the electrical discharge machining. The individual power supply terminals 204 are connected to as many power supply circuits 400 as the number of wires 103 winding around the main rollers.

FIG. 6 is referred to for description. FIG. 6 shows variations of an electrical discharge voltage (Vgn) at the interelectrode and an electrical discharge current (Ign) at the interelectrode, and ON/OFF operation (timing chart) of the transistors Tr1 and Tr2 according to the present invention. The horizontal axis of the graph indicates time.

First, the transistor Tr1 504 is turned on, and the inducing voltage is applied. In this case, because the wire 103 and the workpiece 105 (interelectrode) are isolated from each other, the electrical discharge current at the interelectrode hardly flows. After that, when the electrical discharge current at the interelectrode starts to flow so that the electrical discharge starts, the electrical discharge voltage Vgn drops, and the start of the electrical discharge is detected so that the transistor Tr2 is turned on. Thus, a large electrical discharge current at the interelectrode is obtained. When a predetermined time elapses, the transistor Tr2 is turned off. When a predetermined time elapses from the turn-off of the transistor Tr2, the series of operation is repeated again.

Figure 7:
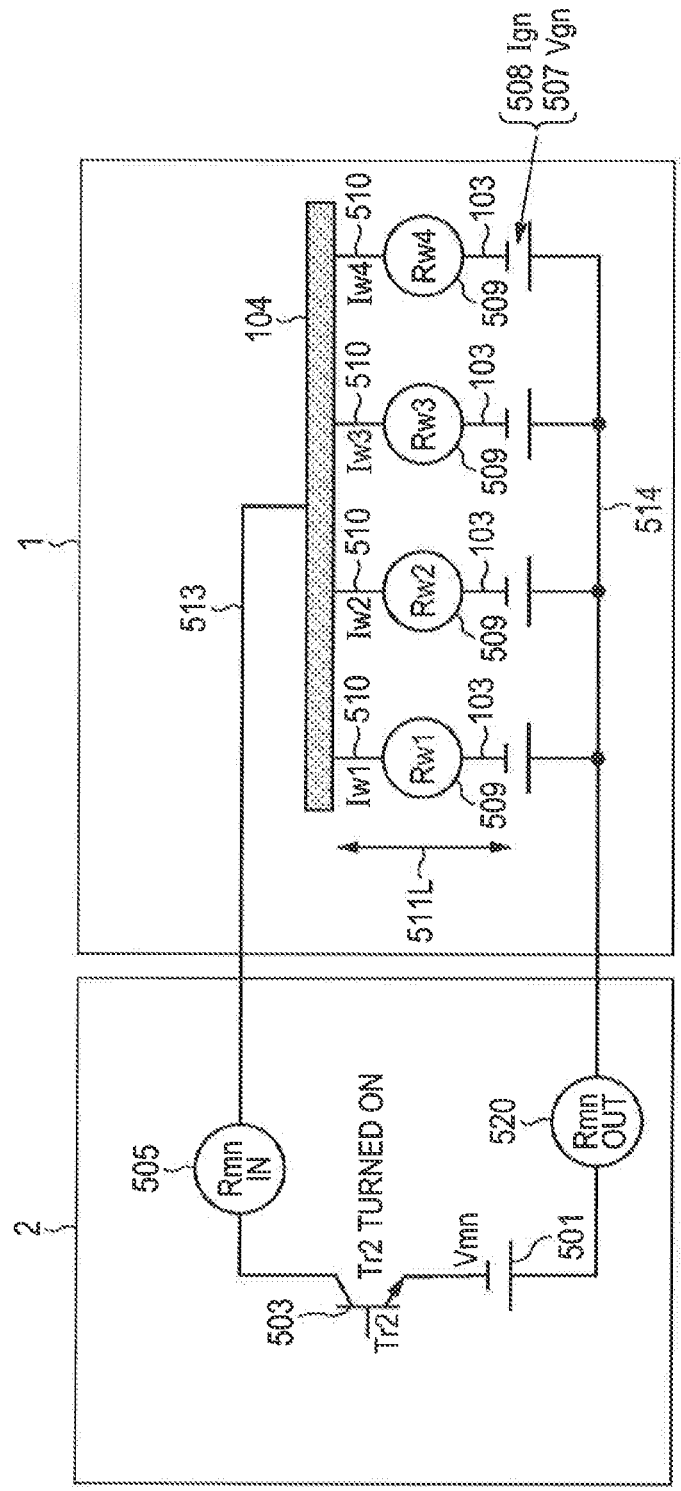
FIG. 7 illustrates a layout of an electric circuit and various components according to the present invention.

FIG. 7 is referred to for description. FIG. 7 illustrates a relationship between the electric circuit in the power supply apparatus 2 and the wire electrical discharge machining apparatus 1 in a batch power supply method of the present invention in which the machining voltage is supplied to the multiple (ten) wires in a batch. FIG. 7 illustrates a state where the machining current as the wire current and the electrical discharge current at the interelectrode are flowing. FIG. 7 illustrates an equivalent circuit to the electric circuit in the power supply apparatus 2 illustrated in FIG. 8.

If the electric circuit 400 of the related-art method illustrated in FIG. 4 is introduced as it is to the electric circuit of the batch power supply method in which the machining voltage is supplied to the multiple (ten) wires in a batch, in order to control the machining current between the machining power supply unit and the power supplying point, it is necessary to arrange a current limiting resistor having a resistance value obtained by dividing Rm by the number (ten) of times for which the wire winds around the main rollers 8 and 9 between the machining power supply unit and the power supplying point, so as to supply the machining current of total (ten times) of a wire current supplied to the multiple (ten) wires. First, description is made of a case where a current limiting resistor having the fixed resistance value Rm/10 is arranged between the machining power supply unit and the power supply terminal.

If the electrical discharge occurs uniformly and simultaneously between the workpiece and all the ten wires, the electrical discharge current is distributed uniformly among the ten wires so that electrical discharge current corresponding to the fixed resistance value (Rm/10) is supplied between the workpiece and each wire. Therefore, supply of an excess electrical discharge current is not a problem.

However, if the electrical discharge does not occur uniformly and simultaneously between the workpiece and all the ten wires, the wire current corresponding to the fixed resistance value (Rm/10) is concentrated between the wire in the electrical discharge state and the workpiece. Therefore, the supply of an excess wire current becomes a problem. In other words, if only one of the ten wires becomes the electrical discharge state, a wire current of ten times the wire current to be usually supplied between the one wire and the workpiece is supplied between the wire in the electrical discharge state and the workpiece, resulting in breakage of the wire.

The wiring 513 is a cable of the up line having an impedance (resistance) 505 connected to a negative pole of the machining power supply unit 501 (Vmn). The wiring 513 supplies the machining voltage from the machining power supply unit 501 (Vmn) to the power supply terminal 104. A wiring 514 is a cable of the down line having an impedance (resistance) 520 connected to a positive side of the machining power supply unit 501 (Vmn).

The resistance value Rmn 505 of the wiring 513 in the present invention is not fixed to a predetermined value unlike the current limiting resistor of the related-art method, and the multi-wire electrical discharge machining apparatus of this embodiment includes a mechanism capable of controlling the resistance value to vary in accordance with the number of wires in the electrical discharge state even if only one of the ten wires becomes the electrical discharge state.

Further, by using the resistance value Rmn 505 of the present invention in a resistance value range sufficiently smaller than a wire resistance Rwn 509, the wire resistance Rwn 509 becomes dominant in limiting the machining current, and hence an influence of the resistance value Rmn 505 can be substantially neglected.

In other words, it is not necessary to provide the current limiting resistor for limiting the upper limit of the machining current, which flows from a machining power supply unit 501 to the power supply terminal 104 and becomes the electrical discharge current of the electrical discharge to the workpiece 105 in the interelectrode. In addition, the resistance value only needs to be smaller than the resistance value obtained by simply dividing Rmn by the number (ten) of times for which the wire winds around the main rollers 8 and 9.

In other words, by using the impedance as the resistance Rwn 509 of each wire, the wire current Iwn is stably supplied to each wire, and hence it is possible to prevent the concentration of the wire current. The resistance Rwn 509 is a resistance of each wire.

Here, the wire resistance value from the power supply terminal 104 to the electrical discharge portion means a resistance due to the wire length of the running wire (one wire) from a contact point with the power supply terminal 104 to the electrical discharge portion. For instance, wire resistances of the ten wires (winding around the main rollers 8 and 9 ten turns) are denoted by $Rw1, Rw2, \ldots, Rw10$ when power is supplied to the ten wires in a batch.

Instead of using the resistance Rm as the resistance for limiting the wire current (Iw) and the electrical discharge current (Ig) of one wire as in the related-art method, the resistance Rwn is used as the resistance for limiting the wire current (Iw) and the electrical discharge current (Ig) of one wire so that the wire current (Iwn) and the electrical discharge current (Ign) of one wire can be limited. In other words, a distance (length L) between the power supplying point (power supply terminal) and the electrical discharge point (electrical discharge portion) is changed so that an arbitrary resistance value can be set. In other words, when Vmn=60 V, Vgn=30 V, and Rwn=10Ω are set, Iwn(Ign)=(60 V−30 V)/10 Ω=3 A is satisfied.

Note that, in the calculation equation given above, a voltage drop from the power supplying point to the electrical discharge point due to the wire resistance Rwn is supposed to be 30 V. However, a voltage drop from the power supplying point to the electrical discharge point due to the resistance Rmn causing a voltage drop from the machining power supply unit to the power supplying point is not considered.

In other words, in the case of the batch power supply method of the present invention, the wire current (Iwn) is determined based on the wire resistance Rwn. Therefore, in order to obtain a desired wire current (Iwn) and an electrical discharge current (Ign) for each wire, the resistance Rmn causing the voltage drop from the machining power supply unit to the power supplying point is set to satisfy the relationship of Rmn<Rwn.

The wire resistance Rwn of each wire is determined by the relationship equation of Rwn=(ρ×L)/B using three parameters, which are (1) a electrical resistivity ρ depending on a material of the wire, (2) a cross-sectional area B of the wire, and (3) a length L of the wire.

The machining power supply unit 501 supplies the machining voltage Vmn. Here, Vmn is a machining voltage set to supply the machining current necessary for the electrical discharge machining. The machining voltage Vmn can be set to an arbitrary voltage. Further, because the machining current supplying amount becomes larger than that in the related-art method, the machining power supply unit 501 supplies a power (the product of the machining voltage and the machining current) larger than that of the machining power supply unit 401. The machining power supply unit 501 supplies the machining voltage (Vmn) to the power supply terminal 104.

A machining power supply unit 502 supplies an inducing voltage Vsn. Here, Vsn is an inducing voltage set to induce the electrical discharge. The machining power supply unit 502 further monitors a state of the electrical discharge voltage (electrical discharge current) between the wire 103 and the workpiece 105, which is used for controlling the workpiece feeding unit. The inducing voltage Vsn can be set to an arbitrary voltage. Further, because the inducing current supplying amount becomes larger than that of the related-art method, the machining power supply unit 502 supplies a power larger than that of the machining power supply unit 402. The machining power supply unit 502 supplies the inducing voltage Vsn to the power supply terminal 104.

A transistor (Tr2) 503 switches between an ON (conductive) state and an OFF (nonconductive) state of the machining voltage Vmn. The transistor (Tr1) 504 switches between an ON (conductive) state and an OFF (nonconductive) state of the inducing voltage Vsn.

An electrical discharge voltage (Vgn) 507 at the interelectrode is a voltage applied between the wire 103 and the workpiece 105 during the electrical discharge. For instance, electrical discharge voltages when supplying power to the ten wires in a batch are denoted by $Vg1, Vg2, \ldots,$ and $Vg10$.

The electrical discharge portion is a portion to which the electrical discharge voltage is applied between the wire 103 and the workpiece 105 by the electrical discharge. At the electrical discharge portion, the electrical discharge occurs to the workpiece based on the machining voltage which is supplied to the multiple running wires in a batch by the contact between the power supply terminal and the multiple running wires.

An electrical discharge current (Igm) 508 at the interelectrode is a current flowing between the wire 103 and the workpiece 105 during the electrical discharge. For instance, electrical discharge currents when supplying power to the ten wires in a batch are denoted by $Ig1, Ig2, \ldots,$ and $Ig10$.

The electrical discharge portion is a portion to which the electrical discharge current flows between the wire 103 and the workpiece 105 by the electrical discharge. At the electrical discharge portion, the electrical discharge occurs to the workpiece based on the machining voltage, which is supplied to the multiple running wires in a batch by the contact between the power supply terminal and the multiple running wires.

A wire current (Iwn) 510 is a wire current supplied to each of the wires. For instance, when the power is supplied to the ten wires in a batch, the wire currents are denoted by $Iw1, Iw2, \ldots,$ and $Iw10$.

A distance 511L between the power supplying point and the electrical discharge point is a wire length between the power supplying point (power supply terminal) and the electrical discharge point (workpiece).

FIG. 8 is referred to for description. FIG. 8 illustrates that the power is supplied to the multiple wires in a batch by the electric circuit in the power supply apparatus 2 in the batch power supply method of the present invention in which the machining voltage is supplied to the multiple (ten) wires in a batch. Further, it should be noted that a structural layout of the multi-wire electrical discharge machining apparatus 1 illustrated in FIG. 8 is different from a structural layout of the multi-wire electrical discharge machining apparatus 1 illustrated in FIGS. 1 and 2, but the electrical structures are the same.

The power supply terminal 104 contacts with the multiple running wires in a batch. The electrical discharge pulse is applied from the power supply terminal 104 arranged at one position opposed to the workpiece 105 so as to perform the electrical discharge machining. One power supply circuit 2 is connected to the multiple (ten) wires 103 winding around the main rollers. Now, with reference to the layout of FIG. 8, description is made of the machining current flowing in the wires (total current of the wire currents).

As illustrated in FIG. 8, the wire current flowing from the power supplying point (at which the power supply terminal 104 contacts with the wire 103) to the electrical discharge point (between the wire 103 and the workpiece 105) flows through two paths via the left and right main rollers, and hence there is a wire resistance corresponding to each path. The length 511L1 is a length (distance) between the power supplying point and the electrical discharge point when the current flows via the left main roller 8 and 9, and a wire resistance determined when the length is L1 is denoted by Rw1a. A length 511L2 is a length (distance) between the electrical discharge point and the power supplying point when the current flows via the right main roller, and a wire resistance determined when the length is L2 is denoted by Rw1b.

A length by which the wire 103 winds around the main rollers 8 and 9 one turn is supposed to be 2 m. Because the power supply terminal 104 and the workpiece 105 are arranged at a distance of substantially half of the length of the wire winding around the main rollers one turn, the distance (wire length L) between the electrical discharge point and the power supplying point is 1 m. Here, the distance of the wire running from the power supply terminal (power supplying point) to the electrical discharge portion only needs to be longer than 0.5 m.

The main component of the material of the wire 103 is iron, and the diameter of the wire is 0.12 mm (having a cross-sectional area of $0.06 \times 0.06 \times \pi$ mm$^2$). Because the wires have the same length (L1=L2=1 m), the wire resistance values Rw1a and Rw1b are set to the same value of approximately 20Ω, and hence a combined wire resistance value of one wire (winding around the main rollers 8 and 9 one turn) constituted of Rw1a and Rw1b is approximately 10Ω.

In addition, in order to set the wire resistance values of the lengths L1 and L2 illustrated in FIG. 8 to the same value, it is preferred to arrange the power supply terminal 104 so that the lengths L1 and L2 have the same value. However, there is no particular problem even if the power supply terminal 104 is arranged so that the lengths L1 and L2 are different from each other within a difference of approximately 10% (for example, L1 is 1 m while L2 is 1.1 m). When the electrical discharge voltages Vg1 to Vg10 are substantially equal to each other, because Vmn is applied to each of Rw1 to Rw10, Iw1 to Iw10 are all the same wire current. Here, Vmn is determined from the voltage drop value (Rw1×Iw1) due to the wire resistance and the electrical discharge voltage (Vgn). The voltage drop from the power supply terminal 104 to the electrical discharge portion is a voltage drop due to the resistance of the running wire. Here, Rw1 is 10Ω (a resistance value from the power supply terminal 104 to the electrical discharge portion). When Iw1 is 3 A, and Vgn is 30 V, Vmn is derived as follows: Vmn=10 Ω×3 A+30 V=60 V. Therefore, the voltage drop from the power supply terminal to the electrical discharge portion only needs to be larger than 10 V, and the resistance value between the power supply terminal and the electrical discharge portion only needs to be larger than 1Ω. Further, from the relationship equation of Rwn=(ρ×L)/B, the voltage drop value due to the wire resistance may be set based on the wire parameters.

Therefore, to calculate Rmn when the electrical discharge state occurs uniformly and simultaneously between the workpiece and all the ten wires, if Iwn=3 A is flowing in the ten wires in the electrical discharge state of all wires, the machining current of 10×3 A=30 A is necessary as a whole between the machining power supply unit 501 and the power supplying point. Supposing that the voltage drop between the machining power supply unit 501 and the power supplying point is one hundredth of Vmn (0.6 V), Rmn in this case is derived as follows. The voltage drop from the machining power supply unit 501 to the power supply terminal 104 only needs to be smaller than 1 V, and the voltage drop from the machining power supply unit 501 to the power supply terminal 104 only needs to be smaller than the voltage drop from the power supply terminal to the electrical discharge portion. Here, Rmn (resistance value between the machining power supply unit 501 and the power supply terminal 104) is 0.6 V/30 A=0.02Ω. Therefore, the resistance value between the machining power supply unit 501 and the power supply terminal 104 only needs to be smaller than 0.1Ω, and the resistance value between the machining power supply unit 501 and the power supply terminal 104 only needs to be smaller than the resistance value between the power supply terminal 104 and the electrical discharge portion. In addition, a ratio of the voltage drop from the machining power supply unit 501 to the power supply terminal 104 to the voltage drop from the power supply terminal 104 to the electrical discharge portion is 10 or larger. Further, a ratio of the resistance value from the machining power supply unit 501 to the power supply terminal 104 to the resistance value from the power supply terminal 104 to the electrical discharge portion is 10 or larger. Here, considering Rmn, the machining current of the ten wires is determined as (60 V−30 V)/((10 Ω/10)+0.02Ω) =29.41 A, and the machining current of one wire is 2.941 A.

In addition, even if a current flows in one wire when the electrical discharge state does not occur uniformly and simultaneously between the workpiece and all the ten wires, the machining current of one wire becomes (60 V−30 V)/(10 Ω+0.02Ω)=2.994 A, which is not so different from the case where the electrical discharge state occurs uniformly and simultaneously between the workpiece and all the ten wires.

In addition, as another effect, when the power is supplied to multiple (N) wires (winding around the main rollers 8 and 9 N turns) at one position (in a batch), the machining speed becomes 1/N of the machining speed in the case where the power is individually supplied to the wires. However, according to the present invention, even in the case where the power is supplied to N wires at one position (in a batch), it is possible to maintain the same machining speed as that of the case where the power is individually supplied to the wires.

Figure 9:
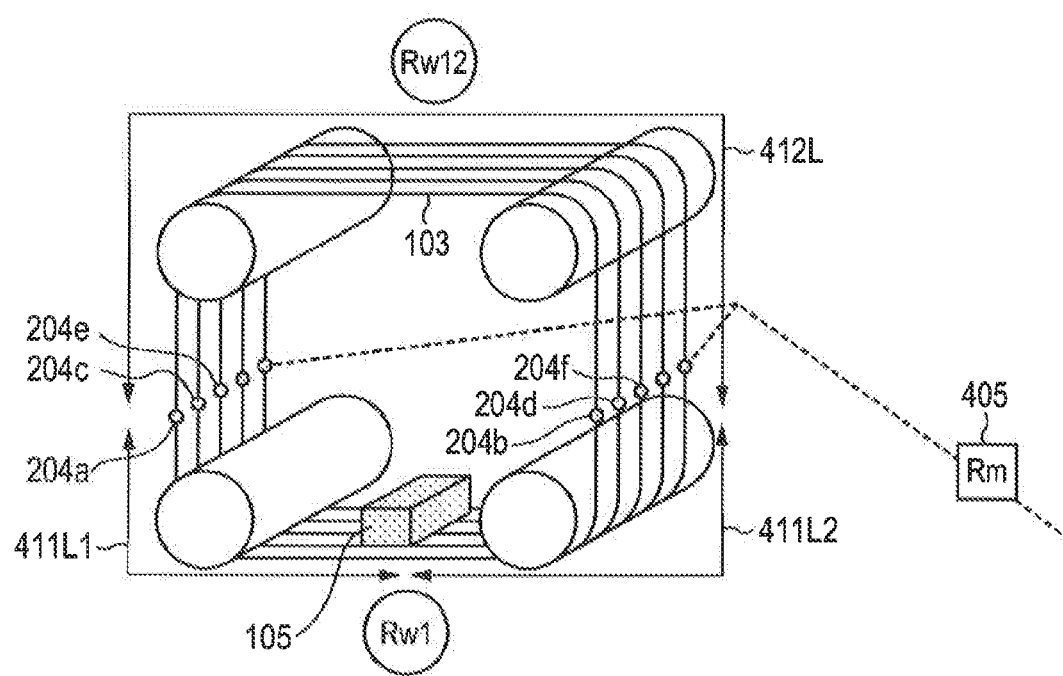
FIG. 9 illustrates a positional relationship viewed from a diagonal direction between power supply terminals and wires of the multi-wire electrical discharge machining system according to the related art.

FIG. 9 is referred to for description. FIG. 9 illustrates an example of the multi-wire electrical discharge machining system of the individual power supply method similarly to FIG. 5.

A pair of individual power supply terminals is arranged close to the workpiece 105 to be machined for the wire winding around four main rollers, so as to perform the power supply. Two (a pair of) individual power supply terminals are arranged for one turn of the wire winding around the main rollers. In addition, upstream of the pair of individual power supply terminals, the internal resistance Rm 405 for limiting an upper limit of the machining current flowing in the pair of individual power supply terminals is arranged. Note that, in FIG. 9, in order to simplify the explanation, the electrical circuit other than a part with respect to the internal resistance Rm 405 is omitted.

This internal resistance Rm 405 is arranged in the electric wiring in order to limit the upper limit of the machining current value of each of the running wires arranged in parallel. The resistance value of the internal resistance Rm 405 is sufficiently larger than the resistance value Rw of the wire corresponding to the length (Rm>>Rw). The reason is that the internal resistance Rm 405 controls the machining current flowing in the wire per turn individually for one turn of the wire.

The length of the wire between the electrical discharge point of the workpiece and an individual power supply terminal 204a is denoted by 411L1. The length 411L1 of the wire makes the resistance value of the wire and corresponds to Rw1a. The wire length between the electrical discharge point of the workpiece and an individual power supply terminal 204b is denoted by 411L2. This wire length 411L2 makes the resistance value of the wire and corresponds to Rw1b. The wire length between the individual power supply terminal 204b and an individual power supply terminal 204c on the side without passing the electrical discharge point of the workpiece is denoted by 412L. This wire length 412L makes the resistance value of a wire and corresponds to Rw12.

As illustrated in FIG. 9, the distance 412L (second distance) of the wire running between the pair of power supply terminals without passing the electrical discharge portion side is longer than 411L1 (first distance). This is because unless the resistance value of the length 412L is larger than the resistance value of the length 411L1, the machining current flows in the direction (path) having the wire resistance value Rw12. As an example, when 411L1 or 411L2 (first distance) is set to 1 m while 412L (second distance) is set to 4 m, the resistance value (impedance) of the length 412L is larger than the resistance value (impedance) of the length 411L1 or 411L2.

Figure 10:
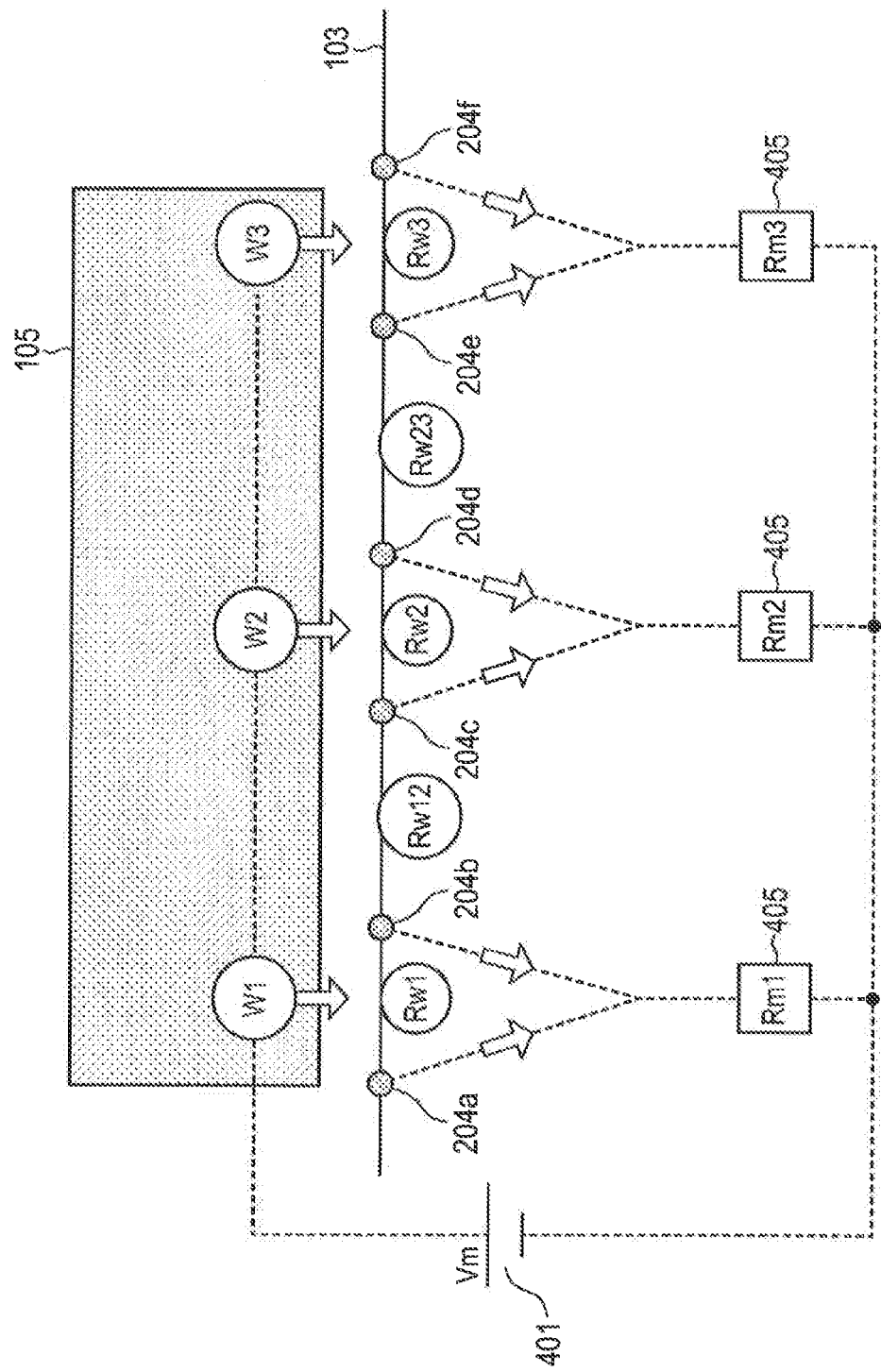
FIG. 10 is a schematic diagram of the electric circuit and machining current flows in the multi-wire electrical discharge machining system according to the related art.

FIG. 10 is referred to for description. FIG. 10 is a diagram illustrating a positional relationship among the wire 103, the power supply terminal 204, and the electrical discharge point of the workpiece by linearly and virtually developing the winding wire illustrated in FIG. 9.

When the wire winding around the four main rollers is virtually developed, the individual power supply terminals 204a to 204f are arranged on the wire 103 with respect to electrical discharge points W1 to W3 of the workpiece. The electrical discharge points of the workpiece (W1 to W3) are respectively arranged between the power supply terminals 204a and 204b, between the power supply terminals 204c and 204d, and between the power supply terminals 204e and 204f. The electrical discharge occurs at each position of the electrical discharge points.

The internal resistances Rm of the individual wires arranged to individually limit the machining current (Iw1 to Iw3) flowing from the machining power supply unit 401 and the electrical discharge points of the workpiece (W1 to W3) are denoted by Rm1, Rm2, and Rm3, respectively. Further, in FIG. 10, the switching element (transistor) 403 for making a pulse of the machining current, and an electrical discharge voltage Vg illustrated in FIG. 4 are not shown.

The resistance value of the wire length between the electrical discharge point of the workpiece W1 and the individual power supply terminal 204a is denoted by Rw1a. The resistance value of the wire length between the electrical discharge point of the workpiece W1 and the individual power supply terminal 204b is denoted by Rw1b. The resistance value of the wire length between the electrical discharge point of the workpiece W2 and the individual power supply terminal 204c is denoted by Rw2a. The resistance value of the wire length between the electrical discharge point of the workpiece W2 and the individual power supply terminal 204d is denoted by Rw2b. The resistance value of the wire length between the electrical discharge point of the workpiece W3 and the individual power supply terminal 204e is denoted by Rw3a. The resistance value of the wire length between the electrical discharge point of the workpiece W3 and the individual power supply terminal 204f is denoted by Rw3b.

Here, because the circuit from W1 to the power supply terminals on both sides is a parallel circuit, the resistance values Rw1a and Rw1b of the wires are supposed to constitute the resistance value Rw1 of the combined wire length (411L) of the parallel circuit for convenience sake. Similarly, the resistance value of the combined wire of the parallel circuit from W2 to the power supply terminals on both sides is denoted by Rw2, and the resistance value of the combined wire of the parallel circuit from W3 to the power supply terminals on both sides is denoted by Rw3.

Further, the resistance value of the wire length (412L) between the individual power supply terminal 204b and the individual power supply terminal 204c via the side other than the electrical discharge point side is denoted by Rw12. The resistance value of the wire length (412L) between the individual power supply terminal 204d and the individual power supply terminal 204e via the side other than the electrical discharge point side is denoted by Rw23.

Figure 11:
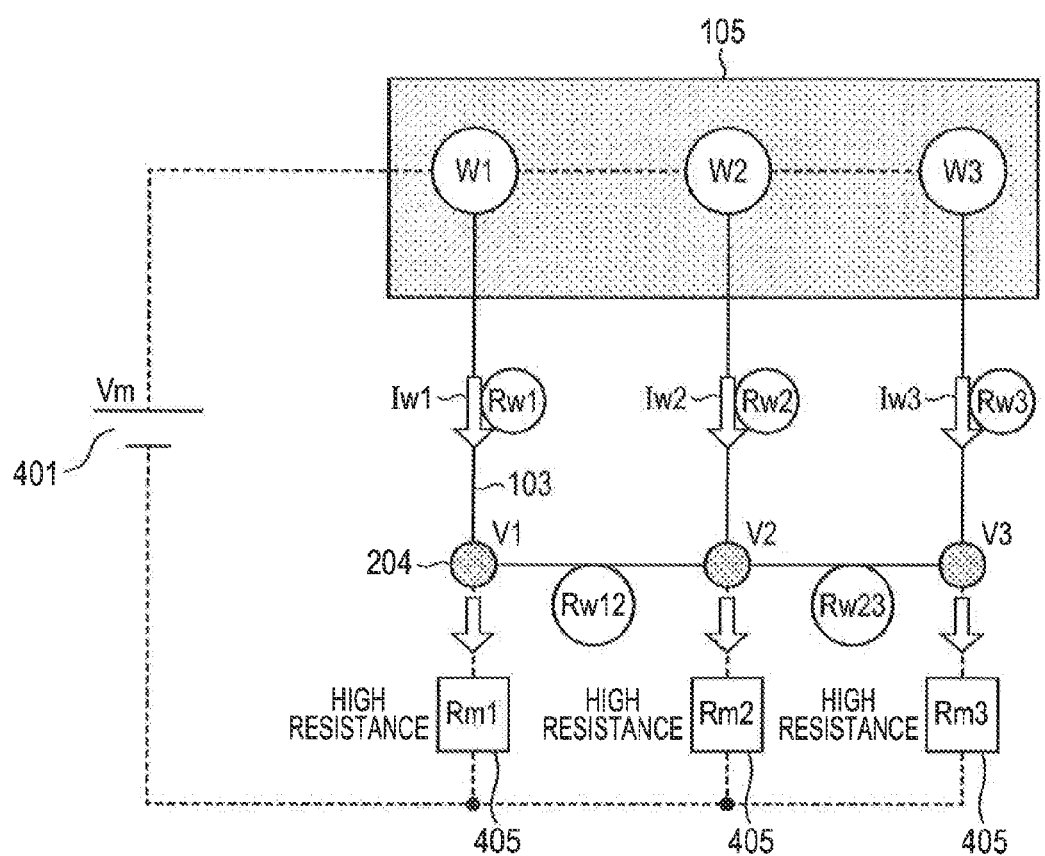
FIG. 11 is a schematic diagram of the electric circuit and machining current flows in uniform electrical discharge in the multi-wire electrical discharge machining system according to the related art.

FIG. 11 is referred to for description. FIG. 11 is a simplified equivalent circuit of the system illustrated in FIG. 9, in which the machining power supply unit 401 is illustrated. FIG. 11 illustrates the equivalent circuit of the multi-wire electrical discharge machining system of the individual power supply method in the state where the electrical discharge occurs simultaneously at the electrical discharge points W1 to W3, and the current Iw1 to Iw3 are respectively flowing in the wires.

In this equivalent circuit, the machining currents Iw1, Iw2, and Iw3 flowing from the electrical discharge points of one turn winding of the wire can be expressed as follows.

$$Iw1 = \frac{Vm}{(Rw1 + Rm1)} \quad \text{(Eq. 1)}$$
$$Iw2 = \frac{Vm}{(Rw2 + Rm2)}$$
$$Iw3 = \frac{Vm}{(Rw3 + Rm3)}$$

Here, when the power supply terminal 204 is arranged at a position close to the electrical discharge point W, the wire length between the power supply terminal 204 and the electrical discharge point W is decreased so that the resistance values Rw1 to Rw3 of the wires become sufficiently smaller than internal resistances Rm1 to Rm3 of the wires. Therefore, Rw1, Rw2, and Rw3 in Equation 1 can be neglected compared with Rm1, Rm2, and Rm3. Here, a potential of the power supply terminal. 204a or 204b is denoted by V1, a potential of the power supply terminal 204c or 204d is denoted by V2, and a potential of the power supply terminal 204e or 204f is denoted by V3. Then, the potentials V1, V2, and V3, and the currents Iw1, Iw2, and Iw3 at positions of the power supply terminals can be simplified from Equation 1 as follows.

$$V1 = Iw1 \times Rm1, Iw1 = \frac{Vm}{Rm1} \quad \text{(Eq. 2)}$$
$$V2 = Iw2 \times Rm2, Iw2 = \frac{Vm}{Rm2}$$
$$V3 = Iw3 \times Rm3, Iw3 = \frac{Vm}{Rm3}$$

Therefore, Rm1, Rm2, and Rm3 are set to the same resistance value, and it is further supposed that Iw1, Iw2, and Iw3 are the same machining current. Then, it is understood that the potentials V1, V2, and V3 are equal to each other from simplified Equation 2. Therefore, in this case, the machining current does not flow in the path having the resistant value Rw12 connecting V1 and V2 that are the same potential, and the machining current also does not flow in the path having the resistant value Rw23 connecting V2 and V3 that are the same potential.

Figure 12:
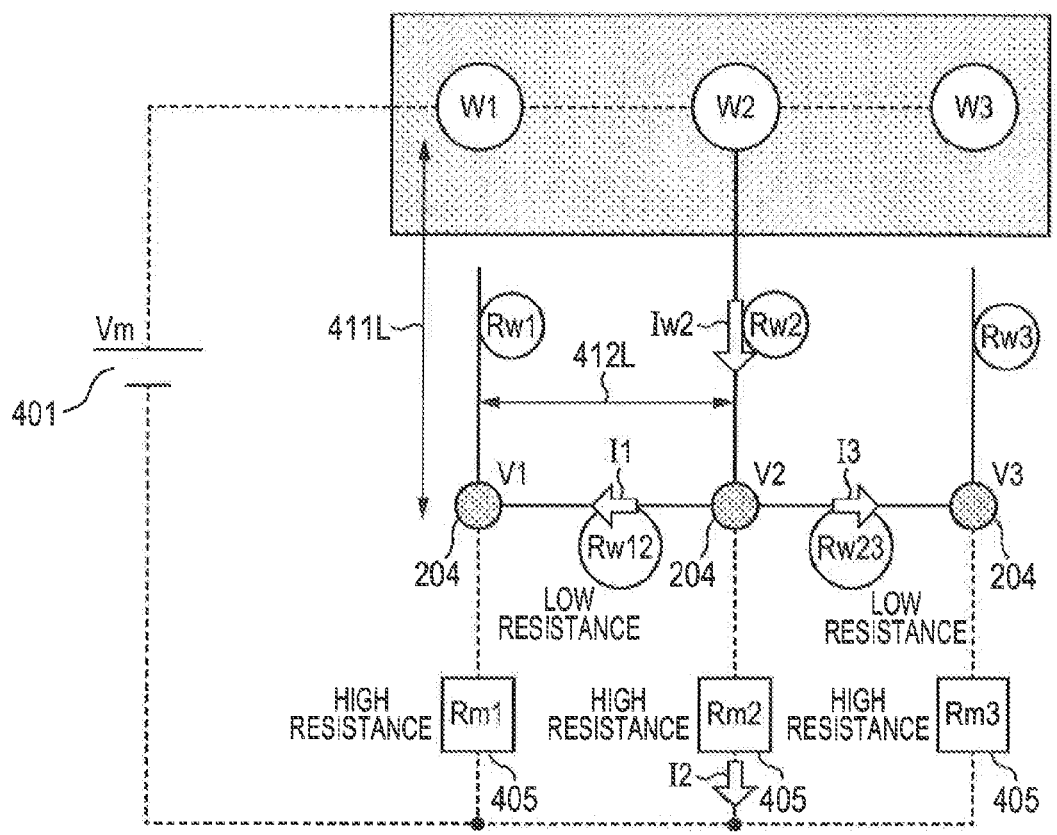
FIG. 12 is a schematic diagram of the electric circuit and machining current flows in partial electrical discharge in the multi-wire electrical discharge machining system according to the related art.

FIG. 12 is referred to for description. FIG. 12 is a simplified equivalent circuit of system of FIG. 9, in which the machining power supply unit 401 is illustrated. FIG. 11 illustrates the equivalent circuit of the multi-wire electrical discharge machining system of the individual power supply method in the state where the electrical discharge does not occur simultaneously at the electrical discharge points W1 to W3 while the electrical discharge occurs only at the electrical discharge point W2, and hence only the current Iw2 is flowing in the wire.

In this case, the machining current Iw2 flows from the power supply terminal 204c in three paths (directions). Therefore, the current value can be derived as follows.

$$Iw2 = \frac{Vm}{(Rw2 + Ra)} \quad \text{(Eq. 3)}$$

where Ra is defined as follow.

$$Ra = \frac{1}{\left(\frac{1}{(Rw12 + Rm1)} + \frac{1}{Rm2} + \frac{1}{(Rw23 + Rm3)}\right)} \quad \text{(Eq. 4)}$$

Also in this case, as in the case described above with reference to FIG. 11, when the power supply terminal 204 is arranged at the position close to the electrical discharge point W, the wire length between the power supply terminal 204 and the electrical discharge point W is decreased so that the resistance values Rw1 to Rw3 of the wires become sufficiently smaller than the internal resistances Rm1 to Rm3 of the wires, and hence Rw1, Rw2, and Rw3 can be neglected. When the potential of the power supply terminal 204c or 204d is denoted by V2, the potential V2 at the position of the power supply terminal can be simplified from Equation 3 as follows.

$$Iw2 = \frac{V2}{Ra} \quad \text{(Eq. 5)}$$

where Ra is expressed as below.

$$Ra = \frac{1}{\left(\frac{1}{(Rw12 + Rm1)} + \frac{1}{Rm2} + \frac{1}{(Rw23 + Rm3)}\right)} \quad \text{(Eq. 6)}$$

Therefore, it is understood that the current value Iw2 is determined depending on the resistance values Rw12 and Rw23.

When the power supply terminal 204 is arranged at the position close to the electrical discharge point, the resistance value Rw12 of the wire length (412L) between the individual power supply terminal 204b and the individual power supply terminal 204c via the side other than the electrical discharge point side becomes larger than Rm2 so that Rm2 is not a large resistance any more. Therefore, the wire current flowing in the path (direction) having the resistance Rw12 is small, and the wire current mainly flows to the path having the resistance Rm2. Similarly, the resistance value Rw23 of the wire length (412L) between the individual power supply terminal 204d and the individual power supply terminal 204e via the side other than the electrical discharge point side becomes larger than Rm2 so that Rm2 is not a large resistance any more. Therefore, the wire current flowing in the path (direction) having the resistance Rw23 is small, and the wire current mainly flows to the path having the resistance Rm2.

However, as illustrated in FIG. 12, when the power supply terminal 204 is arranged at a position far from the electrical discharge point, the resistance value Rw12 of the wire length (412L) between the individual power supply terminal 204b and the individual power supply terminal 204c via the side other than the electrical discharge point side is sufficiently smaller than Rm2 so that Rw12 can be neglected. Therefore, the current Iw2 flows in three directions, and current values I1, I2, and I3 thereof are as follows.

$$I1 = \frac{Vm}{Rm1} \quad \text{(Eq. 7)}$$

$$I2 = \frac{Vm}{Rm2}$$

$$I3 = \frac{Vm}{Rm3}$$

Therefore, the wire current I1 flows also in the path (direction) having the resistance Rw12. Similarly, the resistance value Rw23 of the wire length (412L) between the individual power supply terminal 204d and the individual power supply terminal 204e via the side other than the electrical discharge point side is sufficiently smaller than Rm2 so that Rw23 can be neglected. Therefore, the wire current I3 flows also in the path (direction) having the resistance Rw23.

In this way, in order to prevent the wire currents I1 and I3 from flowing in the paths (directions) having the resistances Rw12 and Rw23, it is necessary to arrange the power supply terminal 204 at the position close to the electrical discharge point W so as to increase the resistance values Rw12 and Rw23. When the internal resistances Rm1, Rm2, and Rm3 are respectively arranged in the wires, it is necessary to arrange the individual power supply terminals 204 to positions as close as possible to the electrical discharge points W as illustrated in FIG. 5, and the individual power supply terminals 204 cannot be arranged at positions far from the electrical discharge points.

Figure 13:
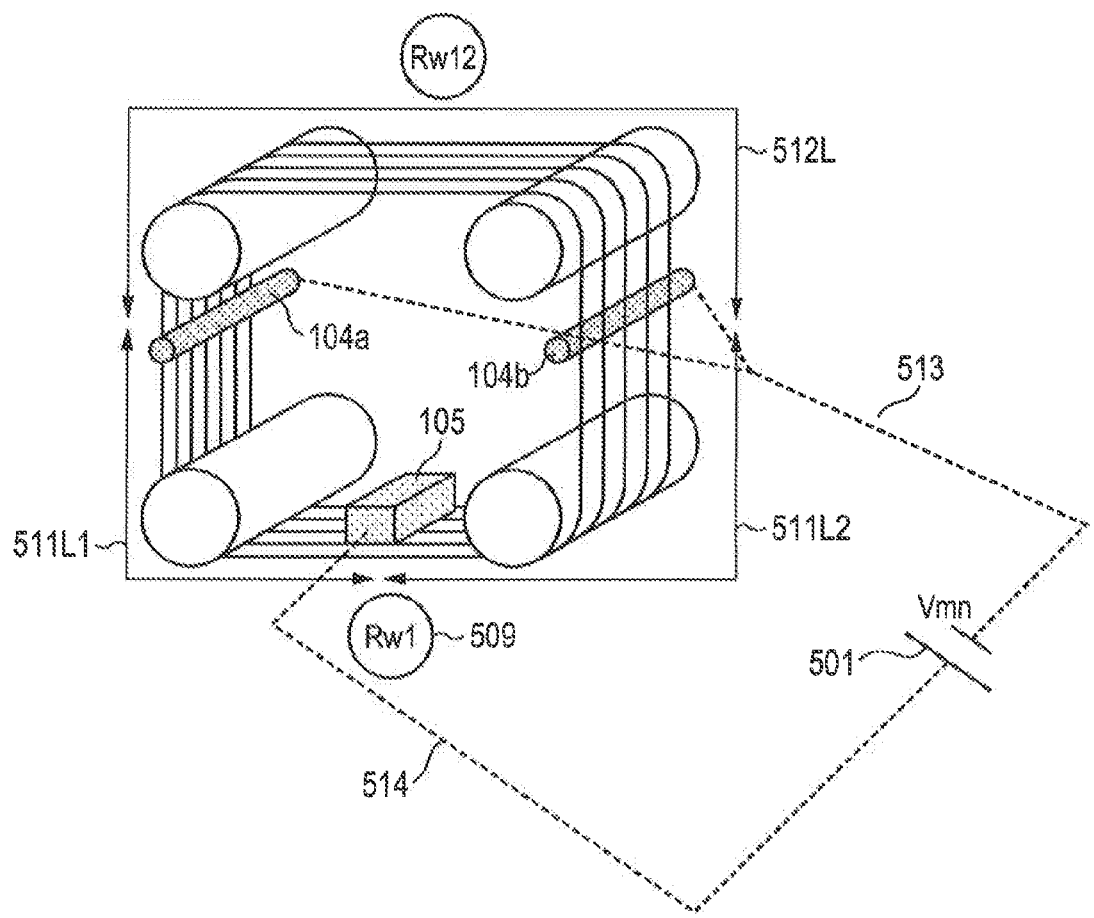
FIG. 13 illustrates a positional relationship viewed from a diagonal direction between power supply terminals and wires of the multi-wire electrical discharge machining system according to the present invention.

FIG. 13 is referred to for description. When the structure of the four main rollers is adopted as illustrated in FIG. 13, the following problem arises. If the power supply terminal 104 is arranged in the same manner as in FIG. 1 in the structure of the four main rollers, the distance between the power supply terminal 104 and the workpiece 105 (electrical discharge point), namely, a wire length 511L becomes long. If the wire length 511L becomes too long, the wire resistance value (impedance) becomes too large, and owing to an influence of the voltage drop, the electrical discharge current value is decreased. Further, because the machining speed (machining rate) is proportional to the electrical discharge current value, the machining speed is also decreased.

In order to prevent a decrease of the machining speed, there is a method of increasing the applied voltage so that the current is increased, but this method causes a problem in that the increase of the voltage causes an increase of power consumption and a decrease of efficiency.

The multi-wire electrical discharge machining system may have a limitation of physical sizes of a wire guide, a workpiece size, and a machining fluid vessel, and hence the distance between the power supplying point and the electrical discharge point, namely, the wire length L may not be set arbitrarily.

Because the power supply terminal and the workpiece are arranged inside the wire loop, the structure including the four main rollers is adopted. In this structure, a pair of power supply terminals is arranged on both left and right sides having the same distance from the workpiece. The power supply terminals 104a and 104b can be arranged at arbitrary and various positions as long as the distances from the workpiece are equal to each other.

In this way, the resistance value (impedance) determined based on the wire length can be arbitrarily adjusted. Similarly to FIG. 1, the electrical discharge current value can be limited by the resistance value (impedance) determined based on the wire length. Therefore, the same electrical discharge current flows in the multiple wires, and the current values can be arbitrarily adjusted under the same applied voltage. In other words, even if the entire wire length becomes long because of the structure including the four main rollers, it is possible to have the same electrical characteristics as in FIG. 1.

The pair of power supply terminals 104a and 104b are respectively arranged at such positions that 511L1 and 511L2 (first distance) of the wires running from the electrical discharge portion W are substantially equal to each other. In the example of FIG. 13, the power supply terminals 104a and 104b are arranged on both sides. Further, the driving unit capable of moving the pair of power supply terminals and the power feed unit is arranged inside the loop of wire winding around the multiple main rollers.

By increasing the number of the power supplying points from one to two (a pair of power supply terminals) as illustrated in FIG. 13, the distance between the power supplying point and the electrical discharge point (electrical discharge portion) has flexibility so that the impedance can be adjusted.

Because the driving unit (not shown) drives the entire power feed unit 10 to slide, it is possible to cause the pair of power supply terminals to contact with the wires and to move the contact position so that 511L1 (first distance) of the running wire varies.

Further, because the pair of power supply terminals and the driving unit are arranged inside the loop of wires winding around the multiple main rollers, it is possible to shorten lengths of branching electric wirings so that the resistance value between the power supply apparatus and the pair of power supply terminals can be reduced more.

In FIG. 13, 512L (second distance) of the wire running between the pair of power supply terminals without passing the electrical discharge portion side is shorter than 511L1 (first distance). This is because even if the resistance value of the length 512L is made smaller than the resistance value of the length 511L1, the machining current does not flow in the paths (directions) having the wire resistance values Rw12 and Rw23. As an example, when 511L1 and 511L2 (first distance) is set to 2 m while 512L (second distance) is set to 1.9 m, the resistance value (impedance) of the length 512L is smaller than the resistance value (impedance) of the length 511L1.

As described above with reference to FIG. 1, also in the wire driving unit illustrated in FIG. 13, one continuous wire winds around the multiple (four) main rollers multiple turns (for example, approximately 2,000 turns) so that the wires are arranged in parallel at substantially the same interval and run in the same direction. When each of 511L1 and 511L2 (first distance) is set to 2 m while 512L (second distance) is set to 1.9 m in this way, a running distance of the wire winding around the multiple main rollers one turn is 5.9 m. Here, 512L (second distance) only needs to be less than one third of the running distance of the wire winding around the multiple main rollers one turn.

Figure 14:
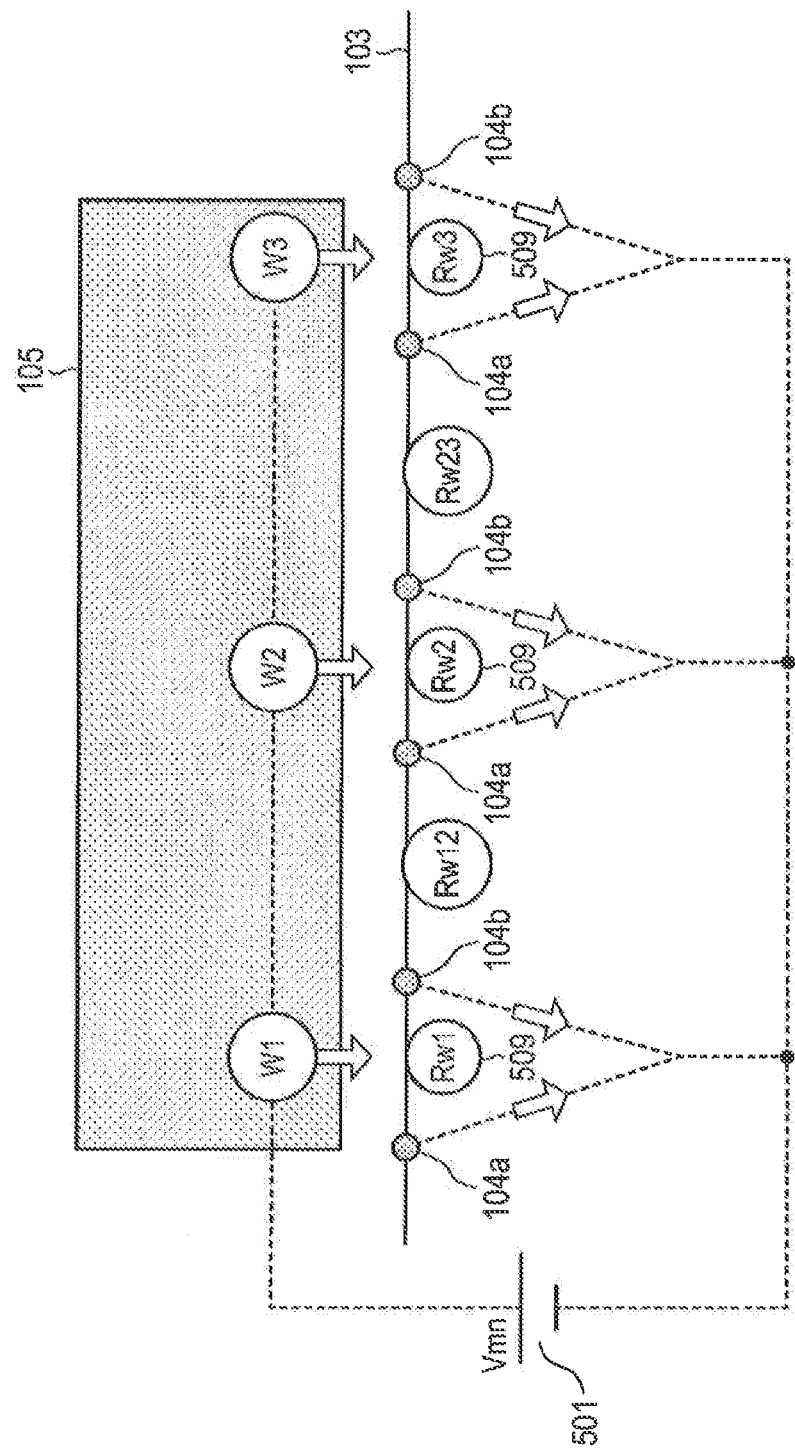
FIG. 14 is a schematic diagram of the electric circuit and machining current flows in the multi-wire electrical discharge machining system according to the present invention.

FIG. 14 is referred to for description. FIG. 14 illustrates a positional relationship between the wire and the power supply terminals, and the electrical discharge circuit in the batch power supply method in the same expression as in FIG. 10. Here, FIG. 14 is significantly different from FIG. 10 in that there are no internal resistances Rm1 to Rm3 of individual wires inside the electric circuit for limiting the largest current flowing in the wires in accordance with the wire resistance values.

Figure 15:
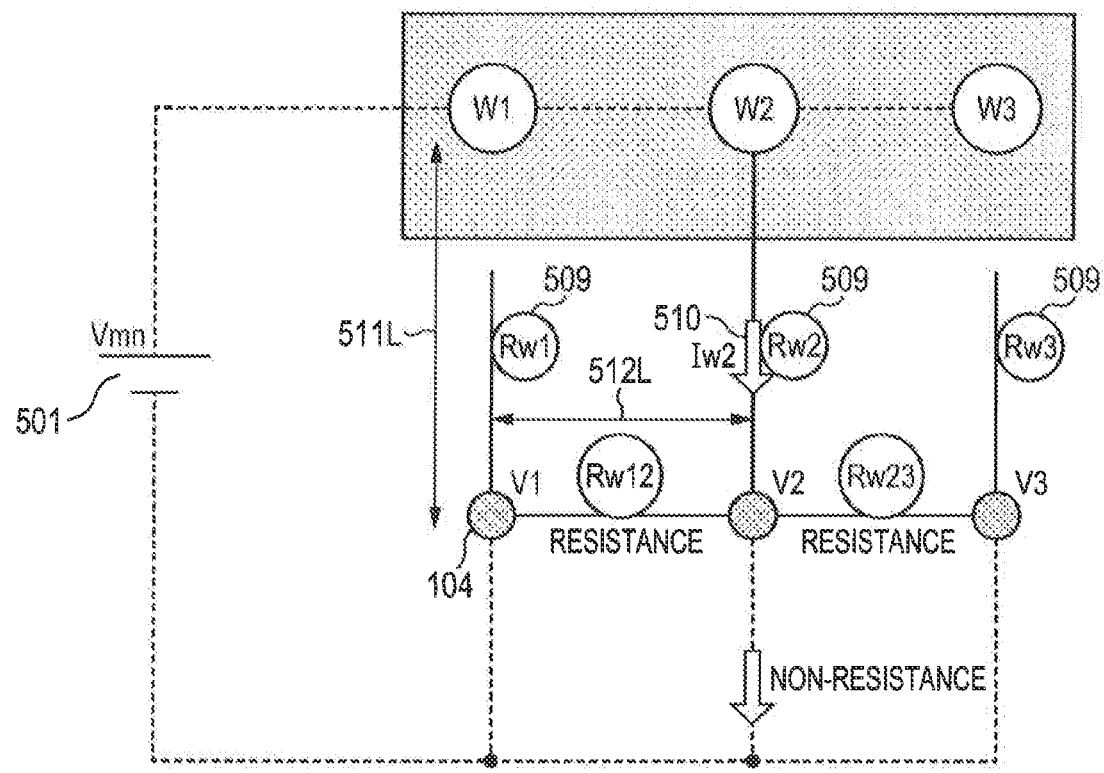
FIG. 15 is a schematic diagram of the electric circuit and machining current flows in partial electrical discharge in the multi-wire electrical discharge machining system according to the present invention.

FIG. 15 is referred to for description. FIG. 15 is an equivalent circuit of FIG. 14, illustrating the multi-wire electrical discharge machining system of the batch power supply method in the state where the electrical discharge does not occur simultaneously at the electrical discharge points W1 to W3 but occurs only at the electrical discharge point W2, and only the current Iw2 is flowing in the wire.

There is no current limiting resistor from the power supply terminals 104a and 104b to the negative pole of the power supply (Vmn) 501. Therefore, the potentials V1, V2, and V3 at positions of the power supply terminals are equal to each other (V1=V2=V3), and hence the machining current does not flow in the paths (directions) having the wire resistance values Rw12 and Rw23.

In other words, in the power supply method in which the internal resistance is eliminated in the electric wiring (Rmn<<Rwn) as illustrated in FIG. 13, the machining current does not flow in the paths (directions) having the resistance values Rw12 and Rw23. Therefore, it is not necessary to arrange the individual power supply terminals 204 as close as possible to the electrical discharge points unlike the power supply method as illustrated in FIG. 9 in which the electric wiring has the internal resistance (Rm>>Rw). In the power supply method of FIG. 13 (Rmn<<Rwn), the pair of power supply terminals 104 can be arranged at arbitrary positions, and there is no problem even if the positions of the pair of power supply terminals 104 are changed.

In other words, the resistance values between the power supply apparatus and the pair of power supply terminals are sufficiently smaller than the resistance value of 511L1 (first distance) of the running wire from one of the pair of power supply terminals to the electrical discharge portion (electrical discharge point W), and hence the machining current does not flow in the paths (directions) having the wire resistance values Rw12 and Rw23.

When the pair of power supply terminals apply machining voltages to the multiple (for example, ten) running wires arranged in parallel in a batch, the potentials V1, V2, and V3 are equal to each other.

FIG. 16A is referred to for description. FIG. 16A is a front view of the multi-wire electrical discharge machining system for simultaneous machining of multiple workpieces according to the present invention. FIG. 16A illustrates multiple (four) main rollers 8 and 9, two workpieces 105a and 105b, two workpiece feeding unit 3a and 3b, and two machining fluid vessels 6a and 6b. The power supply apparatus 2 and the like are the same as those illustrated in FIG. 1, and hence description thereof is omitted.

The main rollers 8 and 9 are four main rollers around which the wires wind so as to run in the same direction. FIG. 16A illustrates a running distance of one turn of the wire winding around the multiple (four) main rollers.

For instance, when one wire winds around the multiple (four) main rollers 100 turns, the 100 wires are arranged in parallel so as to form a wire plane, and hence the workpiece can be cut into a large number of slices (substrates) having a thickness corresponding to the interval between neighboring wires among the 100 wires. The power supply terminals 104a and 104b supply power for the electrical discharge machining to the multiple wires winding around the four main rollers in a batch. The power supply terminal 104a can supply the machining voltage supplied from Vmn 501 to the wires winding around the multiple (four) main rollers. The power supply terminal 104b can supply the machining voltage supplied from Vmn 501 to the wires winding around the multiple (four) main rollers. Two workpiece feeding units 3a and 3b individually feed a workpiece 105a and a workpiece 105b in such a direction that the workpieces 105a and 105b approach the winding wires.

The first workpiece feeding unit 3b is fixedly arranged at a position in an area-A in which the workpiece can be fed toward a wire portion of the wire winding around the multiple (four) main rollers in parallel. This position at which the workpiece feeding unit 3b is fixedly arranged is referred to as a first position.

The second workpiece feeding unit 3a is fixedly arranged at a position in an area-B in which the workpiece can be fed toward a wire portion of the wire winding around the multiple (four) main rollers in parallel. This position at which the workpiece feeding unit 3a is fixedly arranged is referred to as a second position.

Here, the second position at which the workpiece feeding unit 3a is arranged is a position at which the workpiece can be fed toward another wire portion having another wire plane of wires winding around the main rollers in parallel different from a wire plane of the wire portion at which the workpiece feeding unit 3b is arranged as illustrated in FIG. 16A.

The power supply terminal (104b) is fixedly arranged at a position in an area-C in which the power can be supplied to a wire portion of the wires winding around the multiple main rollers in parallel between the first position and the second position as illustrated in FIG. 16A. This position at which the power supply terminal 104b is fixedly arranged is referred to as a third position.

Here, the third position at which the power supply terminal 104b is arranged is a position at which the power can be supplied to another wire portion having another wire plane of wires winding around the main rollers in parallel different from the wire plane of the wire portion at which the workpiece feeding unit 3b is arranged, and is further a position at which the power can be supplied to another wire portion having another wire plane of wires winding around the main rollers in parallel different from that the wire plane of the wire portion at which the workpiece feeding unit 3a is arranged. Therefore, there is no problem as long as the third position is a position at which the power can be supplied to another wire portion completely different from the first position and the second position.

As illustrated in FIG. 16A, the power supply terminals are arranged at the multiple (two) wire portions of the wires winding around the multiple main rollers, and the multiple workpiece feeding units are respectively arranged at positions that equally divide the running distance of the wire winding around the multiple main rollers. The power supply terminals 104a and 104b, and further the workpiece feeding units 3a and 3b all face the wires winding around the four main rollers. The two power supply terminals and the two workpiece feeding units are arranged alternately one by one along the wire winding around the four main rollers.

The power supply terminals and workpiece feeding units are arranged so that the shortest distances (511L1 to 511L4) in which the wire runs between the positions at which the power supply terminal out of the two power supply terminals and the one workpiece feeding unit face the wires winding around the main rollers are substantially the same for the power supply terminals 104a and 104b and the workpiece feeding units 3a and 3b, which are arranged alternately.

It is desired that the two workpiece feeding units be arranged at positions that divide the running distance of the wire winding around the four main rollers (total distance of one turn) into substantially equal portions (halves).

In other words, as illustrated in FIG. 16A, if the power supply terminals are arranged at multiple positions of the wire winding around the multiple main rollers, it is desired that the multiple workpiece feeding units are arranged at positions that divide the running distance of the wire winding around the multiple main rollers into equal portions. Then, by dividing the running distance of one turn of the wire winding around the multiple (four) main rollers by the number of the workpiece feeding units, the impedance component of the wire between the workpiece feeding units can be divided equally. When the distances between the workpiece feeding units are equalized in this way, there is an effect that the impedance components of the wires between the workpiece feeding units can be easily controlled.

Further, FIG. 16A illustrates an example of arranging the workpiece feeding units at two positions for one turn of the wire winding around the main rollers. However, even if the workpiece feeding units are arranged at three or more positions for one turn of the wire winding around the main rollers, the same effect can be obtained, that is, the impedance components of the wires between the workpiece feeding units can be easily controlled when the running distance of one turn of the wire winding around the multiple (four) main rollers by the number of the workpiece feeding units so as to equalize the distances between the workpiece feeding units.

The two power supply terminals are arranged at positions that divide the running distance of the wire winding around the four main rollers (total distance of one turn) into substantially equal portions (halves). The two power supply terminals are respectively arranged between the two workpiece feeding units.

As for the two workpiece feeding units, the two power supply terminals corresponding to the two workpiece feeding units face the one wire winding around the four main rollers. In this way, even if there are multiple workpiece feeding units, the number of the power supply terminals can be minimized. Therefore, if there are four workpiece feeding units so as to machine four workpieces simultaneously, four power supply terminals corresponding to the four workpiece feeding units are arranged to face the one wire winding around the four main rollers.

Figure 16B:
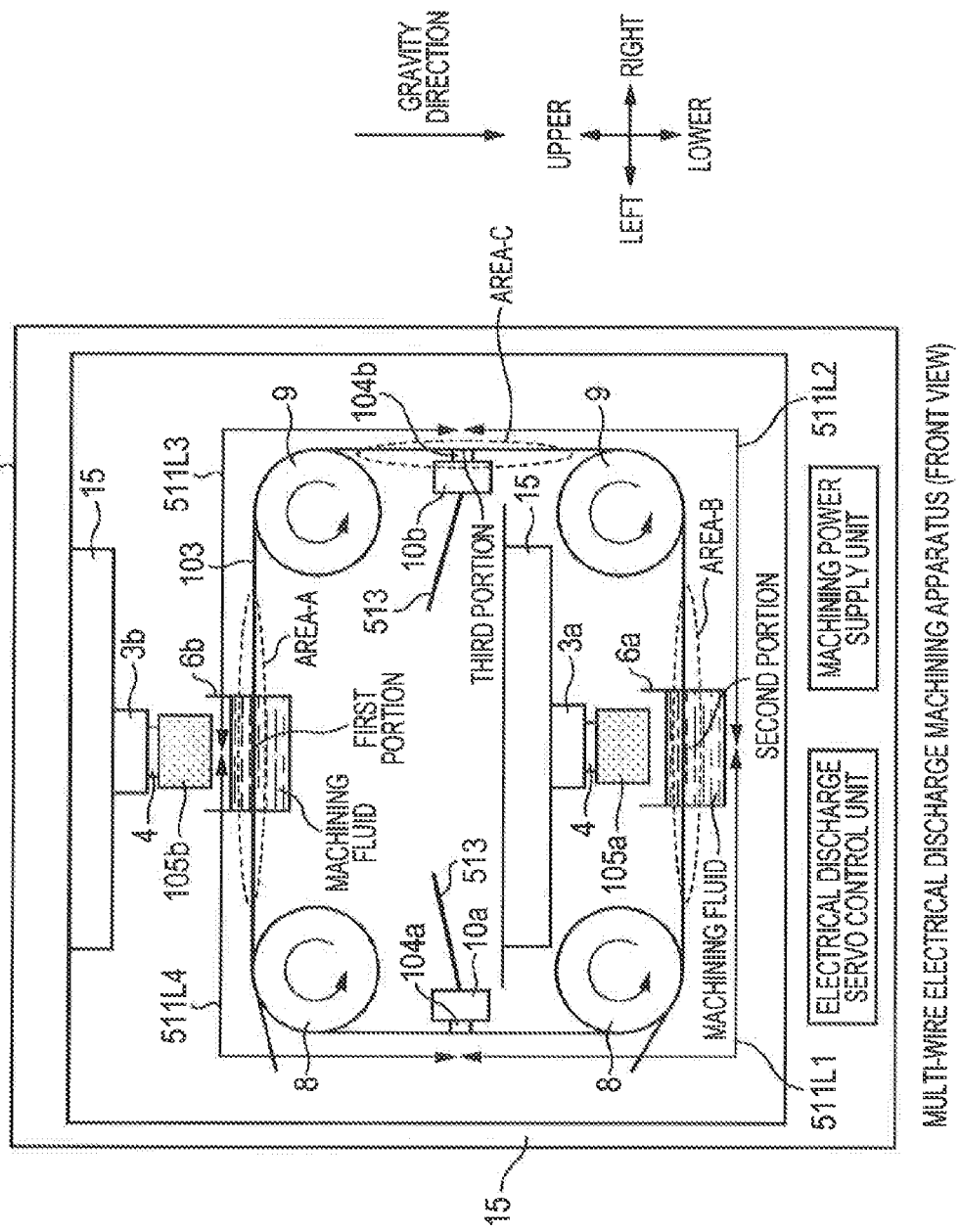
FIG. 16B is a front view of a multi-wire electrical discharge machining apparatus for simultaneous machining of multiple workpieces according to the present invention.

FIG. 16B is referred to for description. FIG. 16B is a front view of a multi-wire electrical discharge machining apparatus 1 for simultaneous machining of multiple workpieces according to the present invention.

A structure of the multi-wire electrical discharge machining apparatus 1 illustrated in FIG. 16B is similar to that of the multi-wire electrical discharge machining apparatus 1 illustrated in FIG. 16A, but the multi-wire electrical discharge machining apparatus 1 illustrated in FIG. 16B includes an electrical discharge servo control unit and the machining power supply unit. The multi-wire electrical discharge machining apparatus 1 having this structure can also perform the same operation as that of the multi-wire electrical discharge machining system illustrated in FIG. 16A.

Figure 17:
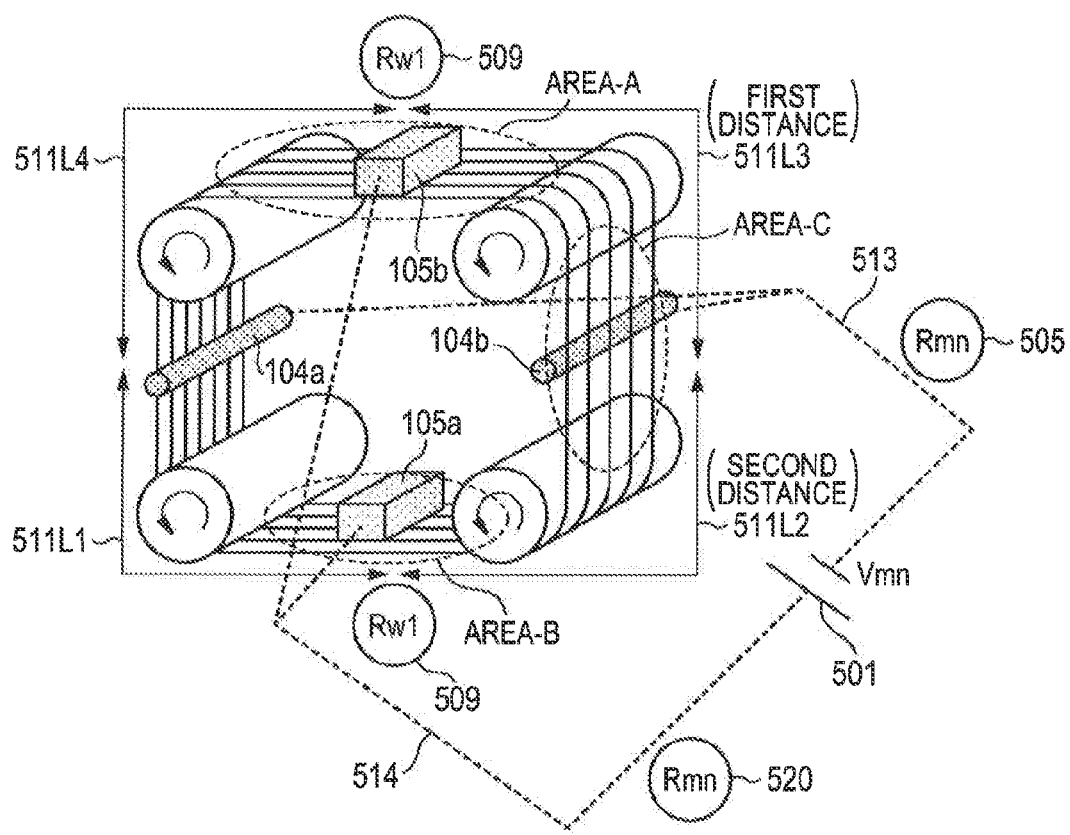
FIG. 17 illustrates a positional relationship viewed from a diagonal direction between power supply terminals and wires in simultaneous slicing of multiple workpieces in the multi-wire electrical discharge machining system for simultaneous machining of multiple workpieces according to the present invention.
Figure 18:
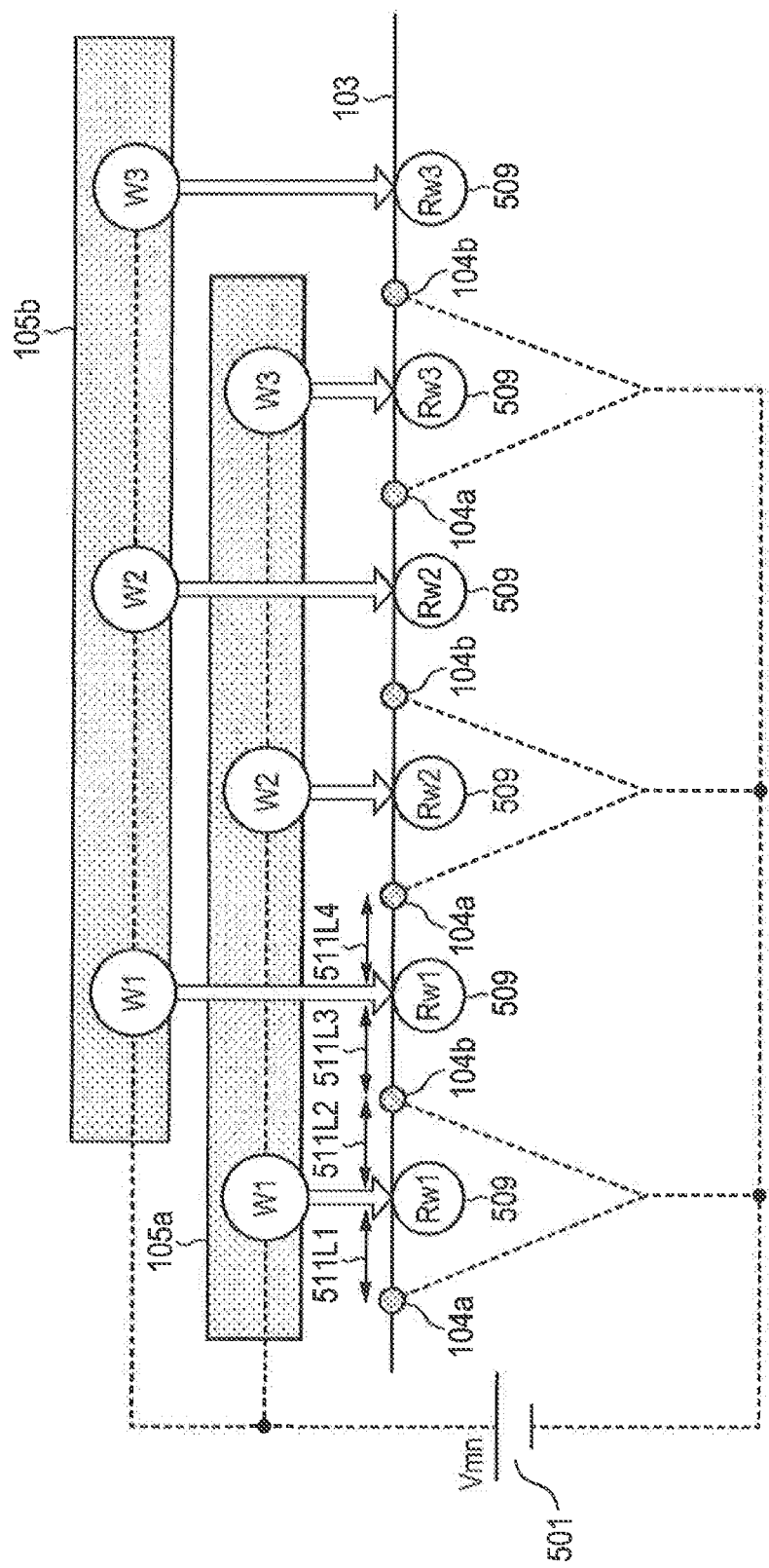
FIG. 18 is a schematic diagram of the electric circuit and machining current flows in simultaneous slicing of multiple workpieces in the multi-wire electrical discharge machining system for simultaneous machining of multiple workpieces according to the present invention.

FIG. 17 and FIG. 18 are referred to for description.

The machining power supply unit (Vmn) 501 illustrated in FIG. 17 supplies power to multiple workpieces (105a and 105b). Therefore, one common machining voltage can be supplied to the multiple workpieces (105a and 105b) in a batch.

The resistance value Rmn 505 illustrated in FIG. 17 is a resistance value of the electric wiring from a negative pole of Vmn 501 to the multiple power supply terminals (104a and 104b). Because this electric wiring has no current limiting resistor (an material to be internal resistance) for limiting the excess machining current, the resistance value of this electric wiring is 0.1Ω or smaller (substantially the resistance of the electric wiring). The resistance value Rmn 520 illustrated in FIG. 17 is a resistance value of the electric wiring from a positive electrode of Vmn 501 to the multiple workpieces (105a and 105b). Because this electric wiring has no current limiting resistor for limiting the excess machining current, the resistance value of this electric wiring is 0.1Ω or smaller (substantially the resistance of the electric wiring).

The reason why the resistance value of each of Rmn 505 and Rmn 520 is set to 0.1Ω or smaller is as follows. Because the impedance component (resistance value) of the wire is more dominant (sufficiently larger) than Rmn 505 and Rmn 520, instead of limiting the total machining current by the electric circuit of the power supply apparatus 2, it is aimed to control the total value of the machining current flowing in the electric wiring in accordance with the impedance component (combined resistance) of the wires of the number causing the actual electrical discharge. In the case of the batch power supply method, one machining voltage is applied to the multiple wires as a parallel circuit method. Therefore, the impedance component (combined resistance) of the wires of the number causing the actual electrical discharge becomes smaller as the number of the wires causing the electrical discharge becomes larger (i.e., the combined resistance is divided by the number of wires causing the electrical discharge), and the total value of the machining current increases. In contrast, the impedance component (combined resistance) of the number of the wires causing the actual electrical discharge becomes larger as the number of the wires causing the electrical discharge becomes smaller (i.e. the combined resistance is divided by the number of wires causing the electrical discharge), and the total value of the machining current decreases. Because the impedance component (resistance value) of the wire is more dominant (sufficiently larger) than the resistance values Rmn 505 and Rmn 520, it is possible to control the total value of the machining current by the impedance component (resistance value) of the wire.

FIG. 17 is a diagram illustrating the layout in which the layout of FIG. 13 is changed so that the two workpieces are cut into slices simultaneously by the wires winding around the (four) main rollers. The structure includes four main rollers. The power supply terminals 104a and 104b are arranged on the left and right sides to have the same distance from the workpieces 105a and 105b.

As illustrated in FIG. 17, the power supply terminals are arranged on the two opposed wire planes of the wires winding around the multiple main rollers. Further, the power supply terminals and the workpiece feeding units are arranged at the same number (two) of positions along the wires winding around the multiple main rollers in parallel.

Further, the multiple (two) power supply terminals and the multiple (two) workpiece feeding units are arranged alternately one by one along the wires winding around the multiple main rollers in parallel. By this layout, the two electrical discharge currents flowing in the direction opposite to each other with respect to the one power supply terminal can be utilized effectively. In addition to that, the two electrical discharge machining currents flowing in the direction opposite to each other with respect to the workpiece at one position can be further equalized so that machining accuracy in the electrode gap length of the workpiece can be improved.

FIG. 18 is referred to for description. FIG. 18 is a diagram schematically illustrating the wire length between the power supply terminal and the each electrical discharge portion (interelectrode) of the workpieces in two different positions as a state in which one wire is virtually developed in the case of the electrical discharge machining illustrated in FIGS. 16A and 16B.

In addition, in the case of the structure including the four main rollers, the power supply terminals 104a and 104b are arranged to have the same distance (vertical distance) from the respective workpieces. The running distance of the wire from the power supply terminal 104a to the center of the workpiece 105a is denoted by 511L1. The running distance of the wire from the power supply terminal 104b to the center of the workpiece 105a is denoted by 511L2. The running distance of the wire from the power supply terminal 104b to the center of the workpiece 105b is denoted by 511L3. The running distance of the wire from the power supply terminal 104a to the center of the workpiece 105b is denoted by 511L4. Then, the power supply terminal 104a, the power supply terminal 104b, the workpiece 105a, and the workpiece 105b are alternately arranged at the same interval along the wire winding around the (four) main rollers in accordance with positions satisfying 511L1=511L2=511L3=511L4. Thus, the wire lengths L of the individual intervals become equal to each other so that impedance components of the individual wire lengths become equal to each other.

Therefore, the resistance value (Rw1a) of the wire through which the machining current flows from the power supply terminal 104a to the center of the workpiece 105a, the resistance value (Rw1b) of the wire through which the machining current flows from the power supply terminal 104b to the center of the workpiece 105a, the resistance value (Rw1c) of the wire through which the machining current flows from the power supply terminal 104b to the center of the workpiece 105b, and the resistance value (Rw1d) of the wire through which the machining current flows from the power supply terminal 104a to the center of the workpiece 105b substantially satisfy Rw1a=Rw1b=Rw1c=Rw1d. Because the upper limit of the machining current value is limited by the resistance value (impedance) determined based on the wire length, the same value of the machining current can flow. Therefore, the same value of the machining current flows in the workpiece 105*a* and the workpiece 105*b*.

The upper half turn (workpiece 105*b* side) with respect to the power supply terminal 104*a* and the power supply terminal 104*b* and the lower half turn (workpiece 105*a* side) with respect to the power supply terminal 104*a* and the power supply terminal 104*b* are connected in parallel.

In addition, as illustrated in FIG. 18, the upper half turn and the lower half turn are independent from each other, and the electrical discharge current generated at the electrical discharge point W1 of the workpiece 105*a* and the electrical discharge current generated at the electrical discharge point W1 of the workpiece 105*b* flow in the direction closest to the power supply terminal. Therefore, the electrical discharge current generated at the electrical discharge point W1 of the workpiece 105*a* and the electrical discharge current generated at the electrical discharge point W1 of the workpiece 105*b* do not interfere with each other. Further, the electric wiring 513 has no internal resistance, and the resistance value Rmn of the wiring from the power supply apparatus to the power supply terminal is smaller than the wire resistance value Rwn of the shortest running distance from the power supply terminal to the electrical discharge portion W. Therefore, the upper limit value of the machining current is determined by the resistance value of the wire length (511L). Therefore, substantially the same machining current as that in the case where a single workpiece is machined as illustrated in FIG. 14 can be obtained. In the multi-wire electrical discharge machining apparatus illustrated in FIGS. 16A and 16B, the simultaneous electrical discharge machining of two workpieces is performed at the same machining rate as that in the case where a single workpiece is machined, and hence machining efficiency can be improved.

Description is made of a minimum length of the wire when 511L1=511L2=511L3=511L4 is substantially satisfied. FIG. 7 is an equivalent circuit of the electrical discharge circuit illustrated in FIG. 16A. The power supply is denoted by Vmn, the transistor is denoted by Tr1, the wire resistance is denoted by Rwn, and the voltage at the interelectrode (electrical discharge voltage between the workpiece and the wire) is denoted by Vgn. Because the parallel circuit is formed in the batch power supply (group power supply), the wire resistance and the voltage at the interelectrode are denoted by Rwn and Vgn. Then, the electrical discharge current Ign is determined by the following equation.

$$Ign = \frac{(Vmn - Vgn)}{Rwn} \quad \text{(Eq. 8)}$$

Therefore, Ign is derived when Rwn, Vgn, and Vmn are determined. Here, Rwn is supposed to be 5Ω. Because Vgn is usually 30 V approximately, Vmn becomes 40 V when Ign is 2 A. This value of Vmn is the minimum necessary value, and the resistance value satisfying this condition is 5Ω.

As to the wire length corresponding to 5Ω in the batch power supply, Rwn is the resistance of the wire and hence corresponds to the wire length. Supposing that the material of the wire is iron and the wire diameter is 0.1 mm, the resistance value per meter is approximately 20Ω. The wire length corresponding to 5Ω is 0.25 m. Because the power is supplied to the electrical discharge point from left and right, which corresponds to the parallel connection, the resistance value on one side is 10Ω. The wire length corresponding to 10Ω is 0.5 m. When 511L1=511L2=511L3=511L4 is substantially satisfied, each wire length is set to be 50 cm or more.

Figure 19:
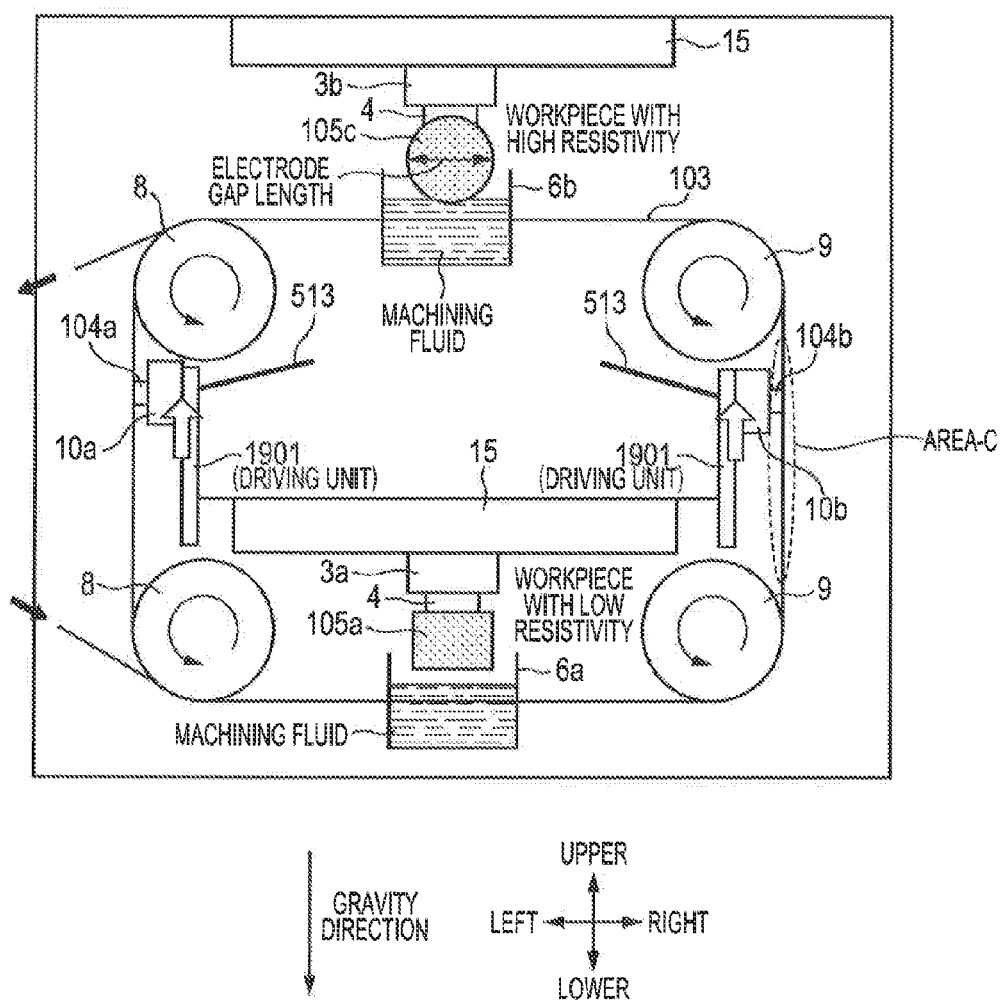
FIG. 19 illustrates a layout example of power supply terminals suitable for simultaneous machining of multiple workpieces having different resistivity values in the wire electrical discharge machining apparatus according to the present invention.

FIG. 19 is referred to for description.

In the embodiment of the present invention, a driving unit 1901 is a mechanism of, for example, driving the entire power feed unit 10*b* to slide in parallel along the wire plane so as to move a power supply position of the power supply terminal 104*b* to be brought into contact with the wire plane. By the driving unit 1901, it is possible to arbitrarily change the fixed position of the power supply terminal 104*b* within the area-C. Note that, the mechanism for arbitrarily changing the fixed position is not limited to the sliding one. The user may manually relocate the power feed unit 10*b* to an arbitrary position selected from multiple predetermined fixed positions, thereby arbitrarily changing the fixed position.

In this way, by driving the entire power feed unit 10*b* to slide in parallel along the wire plane, it is possible to arbitrarily adjust the wire length (first distance) from the first position to the third position and the wire length (second distance) from the second position to the third position together as illustrated in FIG. 17.

In other words, the wire length (first distance) corresponds to an impedance component A of the wire length from the first position to the third position, and the wire length (second distance) corresponds to an impedance component B of the wire length from the second position to the third position. Therefore, the driving unit 1901 is a mechanism for adjusting the impedance components A and B affecting the respective multiple workpieces.

First, as illustrated in FIGS. 16A and 16B, it is now supposed that two workpieces having substantially the same resistivity value (with a difference of less than 1%) measured in advance prior to the electrical discharge machining are set to the workpiece feeding units (3*a* and 3*b*) at the multiple positions so as to perform simultaneous electrical discharge machining (as a batch process). The driving unit 1901 fixedly arranges the power supply terminal 104*b* so that 511L3 (first distance) and 511L2 (second distance) are substantially the same distance (with a difference of less than 1%). Thus, it is possible to realize a batch process of the electrical discharge machining with high uniformity between the two workpieces in terms of the machining width, the machining speed, and the like.

Next, as illustrated in FIG. 19, it is now supposed that the two workpieces 105*a* and 105*c* having different resistivity values (with a difference of 10% or more) measured in advance prior to the electrical discharge machining are set to the workpiece feeding units (3*a* and 3*b*) at multiple positions so as to perform simultaneous electrical discharge machining (as a batch process). The driving unit fixedly places the power supply terminal 104*b* so that a ratio or a difference between 511L3 (first distance) and 511L2 (second distance) becomes an optimal distance determined by the user based on a ratio (1.2 or the like) or a difference (10% or the like) of the resistivity values of the workpieces measured in advance. Thus, it is possible to realize a batch process of the electrical discharge machining with high uniformity between the two workpieces in terms of the machining width, the machining speed, and the like.

Note that, the optimal distance based on a ratio (1.2 or the like) or a difference (10% or the like) of the resistivity values of the workpieces 105*a* and 105*c* measured in advance only needs to have a correlation with a ratio or a difference of the resistivity values of the workpieces, and hence a ratio or a difference between the 511L3 (first distance) and 511L2

(second distance) is not necessarily a value synchronized to a ratio or a difference of the resistivity values of the workpieces measured in advance.

In addition, as another embodiment, the wire electrical discharge machining apparatus of the present invention may hold a data table of a correlation between a resistivity difference and a layout position optimized in advance, and the wire electrical discharge machining apparatus of the present invention may automatically determine the layout position in accordance with a ratio or a difference between the resistivity values of the workpieces measured in advance and input by the user.

Further, as illustrated in FIG. 19, the driving unit moves the power supply terminal to a position close to the workpiece having a higher resistivity value measured in advance so as to perform the electrical discharge machining. Then, the impedance component A of the wire length of a sample having a higher resistivity value of the workpiece becomes lower than the impedance component B of the wire length of a sample having a lower resistivity value of the workpiece. Therefore, there is an effect that the impedance component decreased by shortening the first distance can compensate for the voltage drop due to the sample having a higher resistivity value of the workpiece. Also in the case where the two workpieces having different resistivity values measured in advance before the electrical discharge machining are set to the workpiece feeding units (3a and 3b) at multiple positions so as to perform simultaneous electrical discharge machining (batch process), it is possible to realize the batch process of the electrical discharge machining with high uniformity between the two workpieces in terms of the machining width, the machining speed, and the like.

Further, as illustrated in FIGS. 16A and 16B, even if resistivity values of the workpieces are apparently the same due to the material or the three-dimensional shape like two SiC ingots manufactured in the same manufacturing lot, when the resistivity values of the workpieces measured in advance prior to the electrical discharge machining are measured to be different resistivity values, as illustrated in FIG. 19, the driving unit 1901 may move the power supply terminal 104b to perform the electrical discharge machining so that a ratio or a difference between the first distance and the second distance becomes a distance based on a ratio or a difference between the resistivity values measured in advance.

Figure 20A:
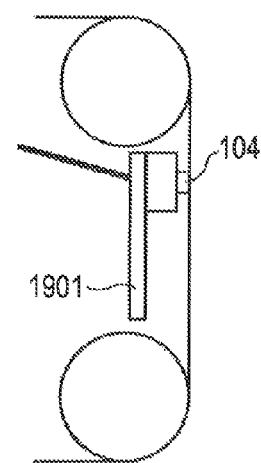
FIGS. 20A, 20B and 20C illustrate movement of a driving unit in the wire electrical discharge machining apparatus according to the present invention.
Figure 20B:
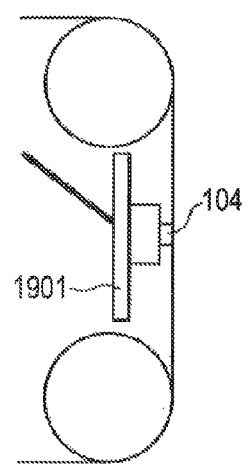
Figure 20C:
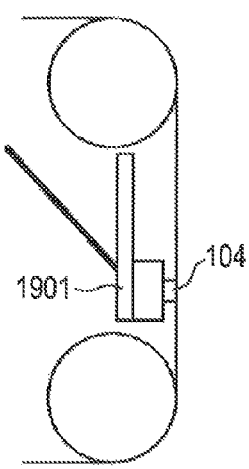

FIGS. 20A to 20C are referred to for description. The FIG. 20A illustrates a state where the driving unit 1901 drives the power feed unit to slide upward (or rightward with respect to a sliding surface) so as to place the power supply terminal 104b. In this case, the first distance is shorter than the second distance.

The FIG. 20B illustrates a state where the driving unit 1901 drives the power feed unit to slide to the center (or the first distance and the second distance are equal to each other) so as to place the power supply terminal 104b.

The FIG. 20C illustrates a state where the driving unit 1901 drives the power feed unit to slide downward (or leftward with respect to the sliding surface) so as to place the power supply terminal 104b. In this case, the first distance is longer than the second distance.

Figure 21:
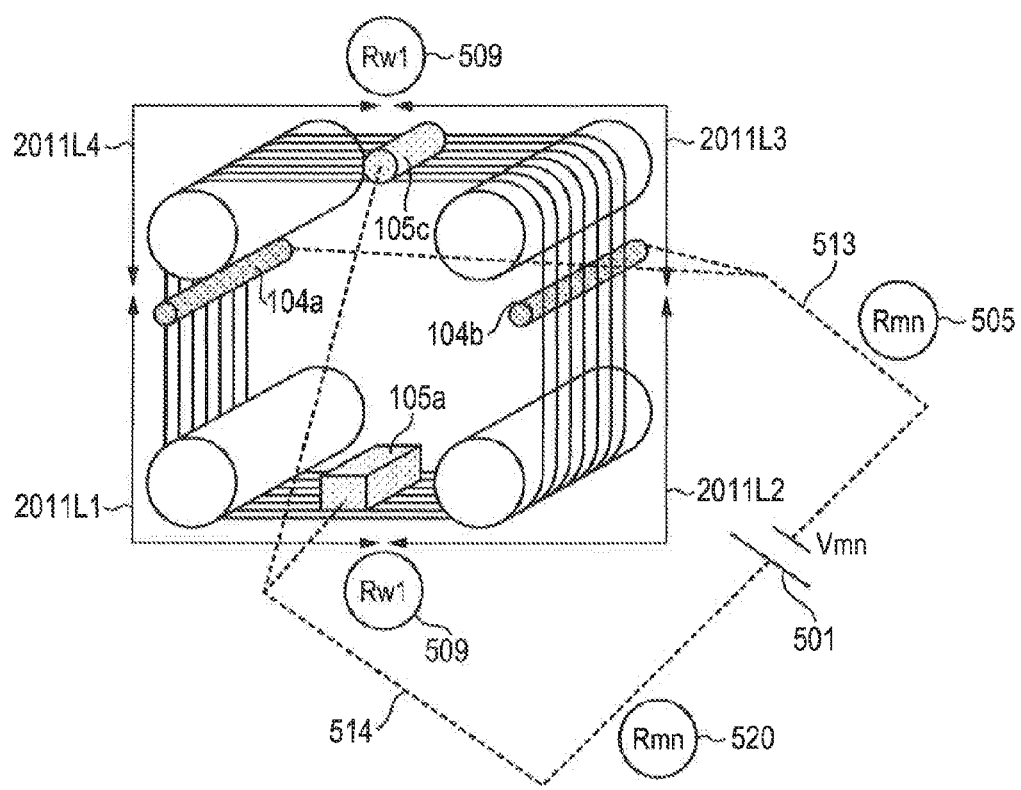
FIG. 21 illustrates a layout example of power supply terminals suitable for simultaneous machining of multiple workpieces having different resistivity values in the wire electrical discharge machining apparatus according to the present invention.

FIG. 21 is referred to for description. FIG. 21 is a perspective view of the wire electrical discharge machining apparatus illustrated in FIG. 19.

The structure includes the four main rollers. The power supply terminals 104a and 104b are arranged on the right and left sides with different distances from workpieces 105c (cylindrical ingot) and 105a (quadrangular prism ingot).

The machining power supply unit (Vmn) 501 illustrated in FIG. 21 is electrically connected to the multiple workpieces (105a and 105c), and hence one common machining voltage can be supplied to the multiple workpieces (105a and 105c) in a batch.

The resistance value Rmn 505 illustrated in FIG. 21 is a resistance value of the electric wiring from the negative pole of the machining power supply unit (Vmn) 501 to the multiple power supply terminals (104a and 104b). Because a current limiting resistor for limiting an excess machining current is not arranged in the electric wiring, the resistance value of the electric wiring can be 0.1Ω or smaller (substantially the resistance of the electric wiring).

The resistance value Rmn 520 illustrated in FIG. 21 is a resistance value of the electric wiring from the positive electrode of the machining power supply unit (Vmn) 501 to the multiple workpieces (105a and 105b). Because a current limiting resistor for limiting an excess machining current is not arranged in the electric wiring, the resistance value of the electric wiring can be 0.1Ω or smaller (substantially the resistance of the electric wiring).

Figure 22:
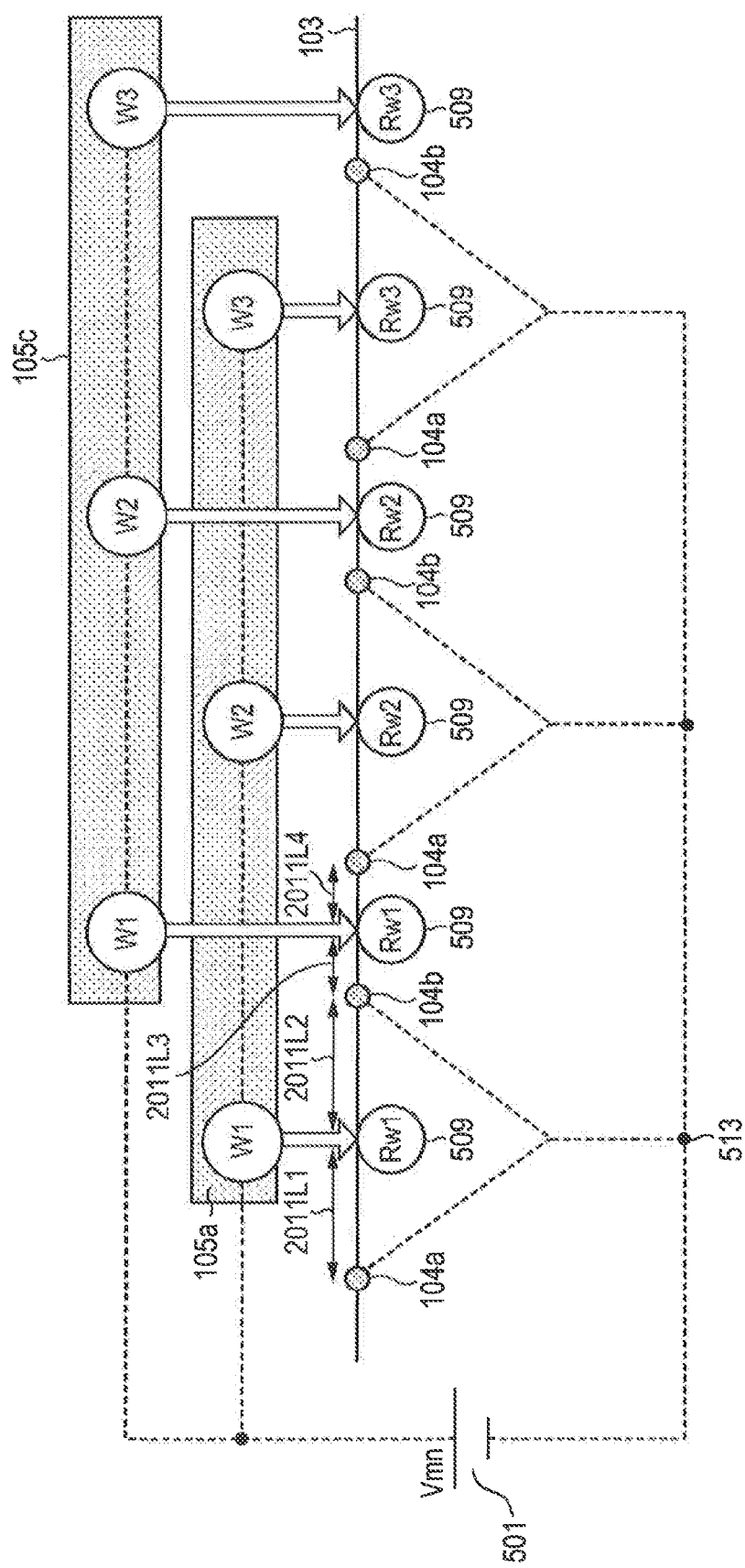
FIG. 22 illustrates a layout example of power supply terminals suitable for simultaneous machining of multiple workpieces having different resistivity values in the wire electrical discharge machining apparatus according to the present invention.

FIG. 22 is referred to for description. FIG. 22 is a diagram schematically illustrating the wire length from each electrical discharge portion (interelectrode) of the different workpieces at two positions to the power supply terminal as a state in which one wire is virtually developed in the wire electrical discharge machining apparatus illustrated in FIG. 19.

In addition, in the case of the structure including the four main rollers, the power supply terminals 104a and 104b are arranged to have different distances (vertical distances) from the respective workpieces. The running distance of the wire from the power supply terminal 104a to the center of the workpiece 105a is denoted by 2011L1. The running distance of the wire from the power supply terminal 104b to the center of the workpiece 105a is denoted by 2011L2. The running distance of the wire from the power supply terminal 104b to the center of the workpiece 105c is denoted by 2011L3. The running distance of the wire from the power supply terminal 104a to the center of the workpiece 105c is denoted by 2011L4. Then, the power supply terminal 104a, the power supply terminal 104b, the workpiece 105a, and the workpiece 105c are arranged alternately along the wire winding around the (four) main rollers in accordance with positions satisfying 2011L1=2011L2 and 2011L3=2011L4. Thus, the wire lengths L of the 2011L1 and 2011L2 become equal to each other so that impedance components of the wire lengths can be made equal to each other. Further, the wire lengths L of the 2011L3 and 2011L4 are also equal to each other so that impedance components of the wire lengths can be made equal to each other.

Therefore, the resistance value Rw1a of the wire through which the machining current flows from the power supply terminal 104a to the center of the workpiece 105a, the resistance value Rw1b of the wire through which the machining current flows from the power supply terminal 104b to the center of the workpiece 105a, the resistance value Rw1c of the wire through which the machining current flows from the power supply terminal 104b to the center of the workpiece 105c, and the resistance value Rw1d of the wire through which the machining current flows from the power supply terminal 104a to the center of the workpiece 105c also substantially satisfy Rw1a=Rw1b and Rw1c=Rw1d. Because the upper limit of the machining current value is limited by the resistance value (impedance) determined based on the wire length, the same value of the machining current can flow on both sides of the workpiece so that machining accuracy can be improved.

Figure 23:
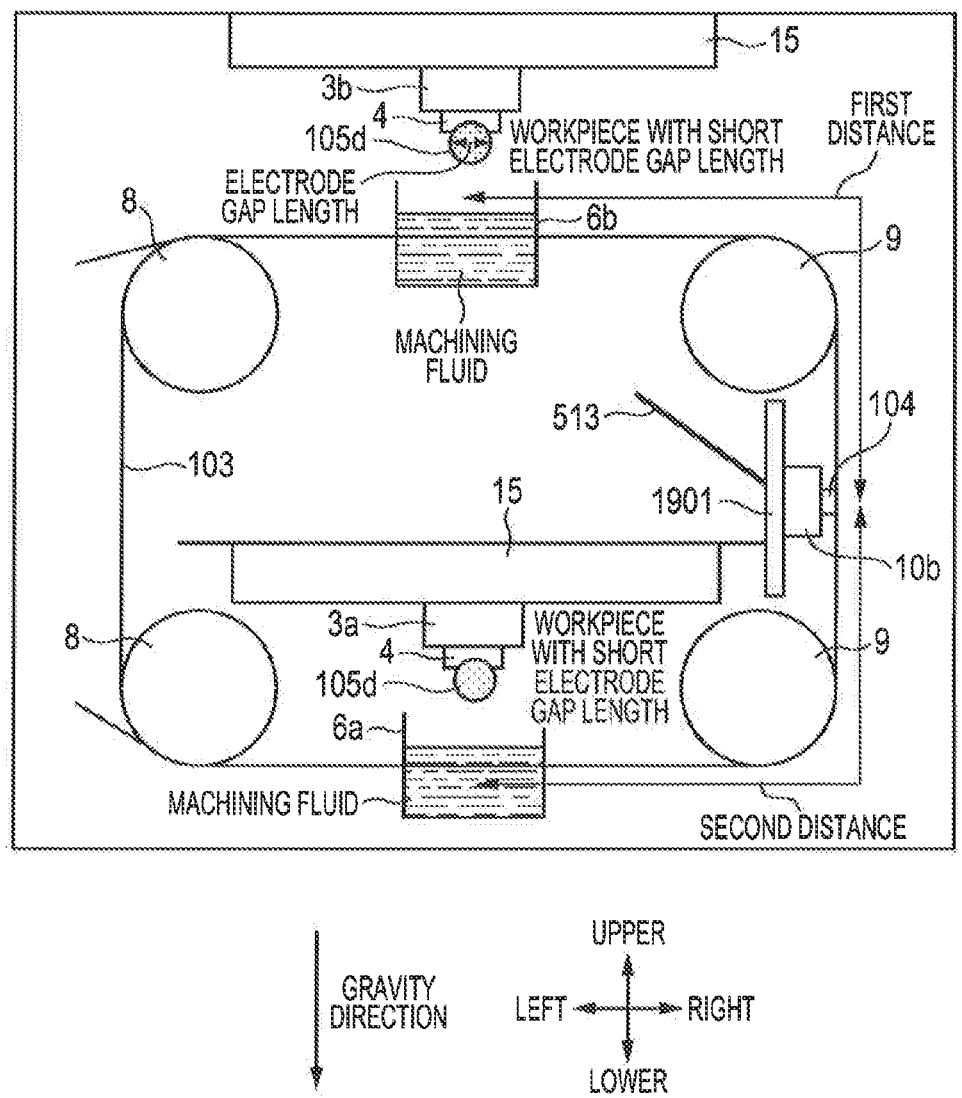
FIG. 23 illustrates a layout example of power supply terminals suitable for simultaneous machining of multiple workpieces having the same resistivity and a short electrode gap length in the wire electrical discharge machining apparatus according to the present invention.

FIG. 23 is referred to for description. FIG. 23 illustrates a case where the sample is small, and the electrical discharge machining is performed on the workpiece having an electrode gap length (largest length of electrical discharge to the machined surface of the workpiece by the wire) of 3 cm, for example. In the example illustrated in FIGS. 16A and 16B, the electrode gap length is 15.6 cm if the workpiece is a 6-inch ingot. Because the electrode gap length in this case is relatively long, in order to machine the workpiece uniformly within the electrode gap length, the power supply terminals need to be arranged on the left and right sides as illustrated in FIGS. 16A and 16B. However, if the electrode gap length is short as illustrated in FIG. 23, a variation of a position at which the electrical discharge occurs within the electrode gap length becomes small. Therefore, as illustrated in FIG. 23, even if the power supply terminal is arranged at one of left and right sides, the machining can be performed uniformly within the electrode gap length.

In this case, the power supply terminal can be arranged at one of the left and right sides as long as the electrode gap length is 10% or less of the first distance (511L3). For instance, when the electrode gap length is 3 cm and the first distance (511L3) is 50 cm, even if the power supply terminal is arranged at one of the left and right sides, the influence to the machining accuracy is small. In contrast, for example, when the electrode gap length is 15.6 cm and the first distance (511L3) is 50 cm, better machining accuracy can be obtained by arranging the power supply terminals at two positions on both left and right sides.

Figure 24:
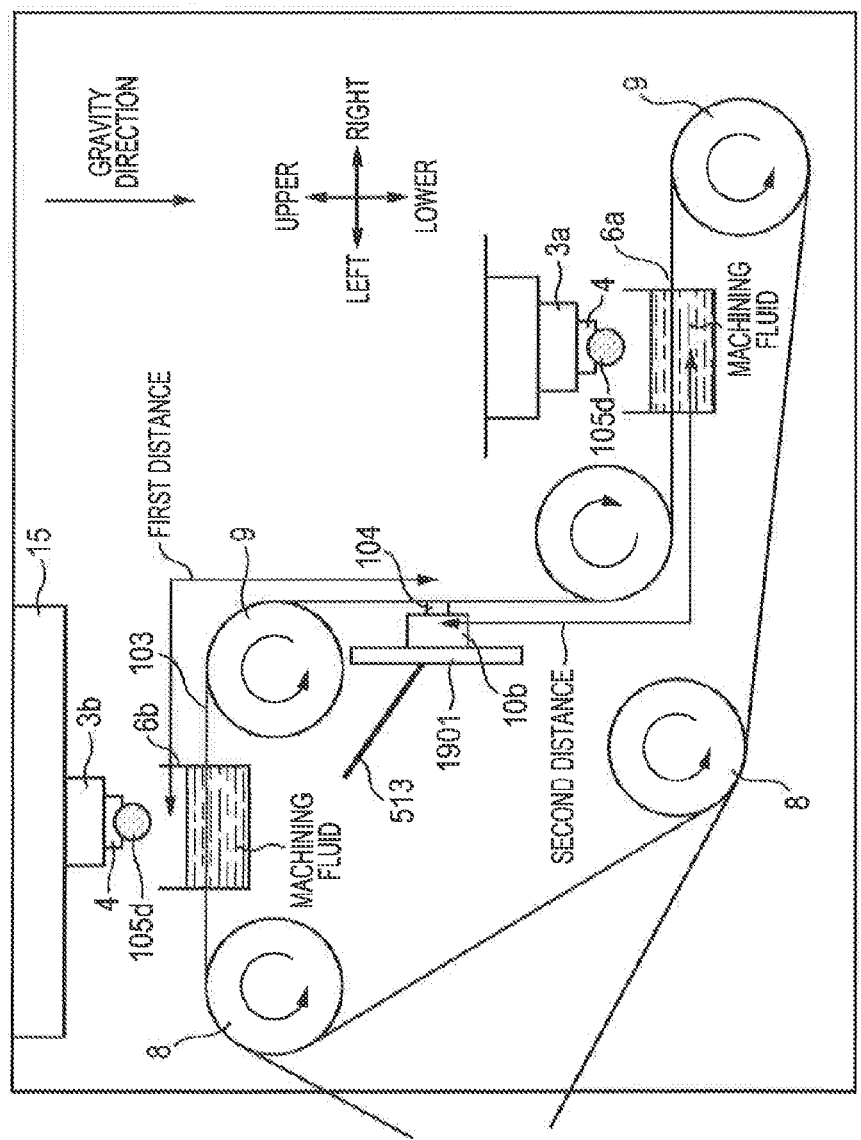
FIG. 24 illustrates a layout example of power supply terminals suitable for simultaneous machining of multiple workpieces having the same resistivity and a short electrode gap length in the wire electrical discharge machining apparatus according to the present invention.

FIG. 24 is referred to for description. FIG. 24 illustrates a diagram in which the layout illustrated in FIG. 23 is further modified. In the case of performing the simultaneous machining of the workpieces having the same resistivity as a batch process, when the first distance and the second distance are equal to each other, there is no problem even if the wires are arranged in parallel to run in the opposite directions in the first position and the second position as illustrated in FIG. 23, and there is no problem even if the wires are arranged in parallel to run in the same direction as illustrated in FIG. 24.

Figure 25:
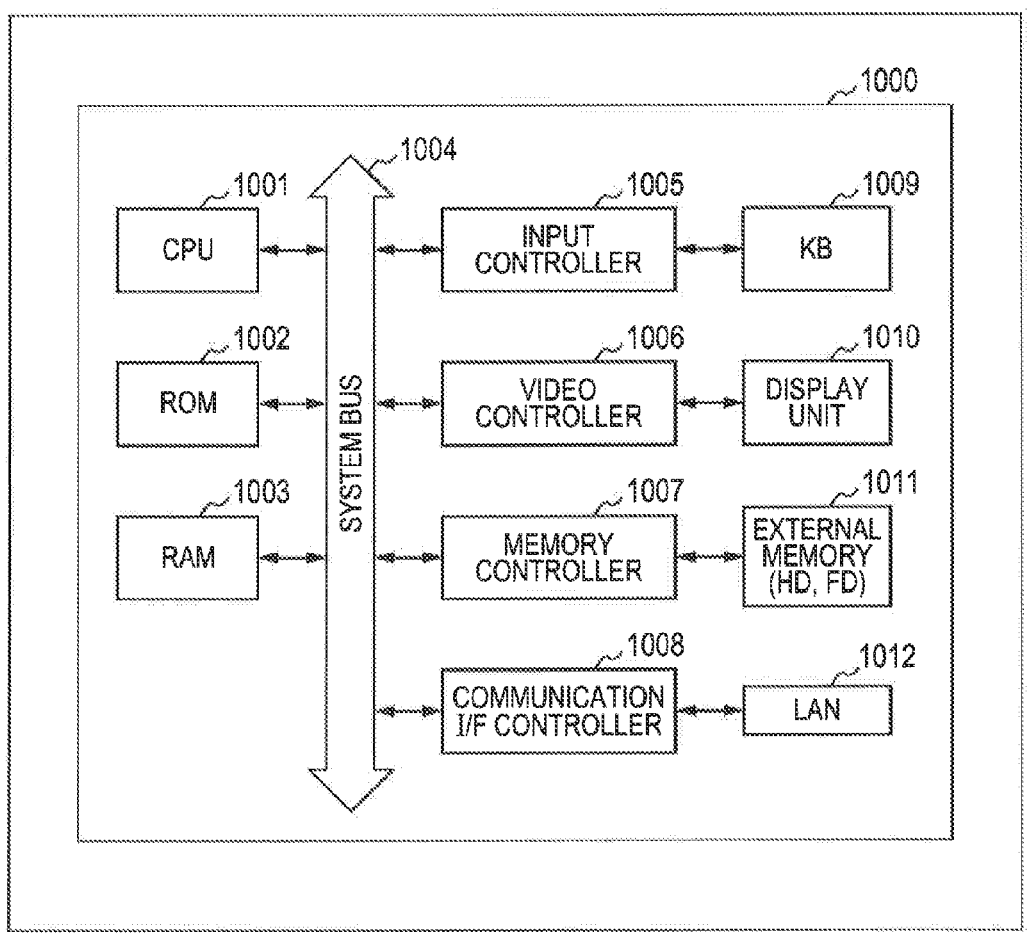
FIG. 25 illustrates an example of a hardware configuration of a control computer configured to control operation according to the present invention.

FIG. 25 is referred to for description. FIG. 25 illustrates a hardware configuration of a control computer 1000 built in the wire electrical discharge machining apparatus.

In FIG. 25, an MPU (CPU) 1001 integrally controls devices and controllers connected to a system bus 1004. A ROM 1002 or an external memory 1011 stores a basic input/output system (BIOS) and an operating system program (hereinafter referred to as an OS) as a control program of the CPU 1001, and various programs described later necessary for realizing functions of servers and PCs.

A RAM 1003 works as a main memory and a working area for the CPU 1001. When performing a process, the CPU 1001 loads necessary programs and the like from the ROM 1002 or the external memory 1011 to the RAM 1003, and executes the loaded program to realize various operations.

An input controller 1005 controls inputs from a keyboard (KB) 1009 or a pointing device such as a mouse (not shown). A video controller 1006 controls display on a display unit 1010. Note that, the display unit 1010 may be not only a CRT but also other displays such as a liquid crystal display. The display is used by an administrator as necessary. In addition, the display unit may have a touch panel function by which the user designates an object position on the display screen using a finger or a pen.

A memory controller 1007 controls an access to the external memory 1011, such as a hard disk (HD), a flexible disk (FD), and a compact flash (trademark) memory connected via an adapter to a PCMCIA card slot, which stores a boot program, various applications, font data, user files, edited files, various data, and the like.

A communication I/F controller 1008 connects and communicates to/from an external device via a network (communication line), such as LAN 1012 and WAN (not shown), so as to control network-based communication. For instance, communication using TCP/IP can be performed.

Note that, the CPU 1001 performs a deploying (rasterizing) process of outline fonts in a display information area in the RAM 1003 so as to enable displaying on the display unit 1010. In addition, the CPU 1001 enables the user to designate a position on the CRT by a mouse cursor (not shown) or the like.

Various programs described later for realizing the present invention are stored in the external memory 1011 and are loaded to the RAM 1003 as necessary so as to be executed by the CPU 1001. Further, data files, data tables, and the like used when the program is executed are also stored in the external memory 1011 or a storage unit.

In addition, the program in the present invention is a program that can be executed by the control computer 1000 for performing the multi-wire electrical discharge machining operation in accordance with the multi-wire electrical discharge machining method, and a storage medium of the present invention stores the program can be executed for performing the multi-wire electrical discharge machining operation.

Other Embodiments of the Present Invention

It should be understood that the object of the present invention can be achieved also by a structure in which a non-transitory computer-readable recording medium having stored thereon the program for realizing the function of the embodiment described above is supplied to the wire electrical discharge machining apparatus, and the computer (CPU or MPU) in the system or the apparatus reads and executes the program stored in the non-transitory computer-readable recording medium.

In this case, the program itself read out from the recording medium realizes the novel function of the present invention, and the non-transitory computer-readable recording medium having the program stored thereon constitutes the present invention.

As the recording medium for supplying the program, it is possible to use, for example, a flexible disk, a hard disk, an optical disc, a magneto-optical disk, a CD-ROM, a CD-R, a DVD-ROM, a BD-ROM, a magnetic tape, a non-volatile memory card, a ROM, an EEPROM, a silicon disk, or the like.

In addition, it should be understood that the present invention encompasses not only the case where the above-mentioned function of the embodiment is realized when the read program is executed but also the case where based on an instruction of the program, an operating system (OS) or the like running on the computer performs a part or a whole of the actual process to realize the above-mentioned function of the embodiment.

Further, it should be understood that the present invention also encompasses the case where the program read out from the recording medium is written in a memory of a function extension board inserted in the computer or a function extension unit connected to the computer, and then based on an instruction of the program code, a CPU or the like of the function extension board or the function extension unit performs a part or a whole of the actual process to realize the above-mentioned function of the embodiment.

In addition, the present invention may be applied to a system including multiple devices or to an apparatus including a single device. In addition, it should be understood that the present invention can also support the case where the above-mentioned function is achieved by supplying the program to a system or an apparatus. In this case, the recording medium having stored thereon the program for achieving the present invention is read by the system or the apparatus so that the system or the apparatus can obtain the effect of the present invention.

Further, by downloading and reading the program for achieving the present invention from a server, a database, or the like on the network by using a communication program, the system or the apparatus can obtain the effect of the present invention.

Note that, structures obtained by combining the above-mentioned embodiments and variations are all encompassed in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-135720, filed Jun. 28, 2013, and No. 2014-061434, filed Mar. 25, 2014, which are hereby incorporated by reference herein in their entirety.

What is claimed is:

1. A wire electrical discharge machining apparatus for electrical discharge machining of a workpiece, comprising:
   multiple main rollers around which a wire winds in parallel;
   multiple workpiece feeding units arranged to feed the workpiece toward the wire winding around the multiple main rollers;
   a machining power supply unit configured to supply a machining voltage to the workpiece; and
   a power supply terminal configured to supply the machining voltage to the wire winding around the multiple main rollers,
   wherein the multiple workpiece feeding units are respectively arranged at a first position at which the workpiece is fed toward a wire portion having a wire plane of the wire winding around the multiple main rollers in parallel and a second position at which another workpiece is fed toward another wire portion having another wire plane of the wire winding around the multiple main rollers in parallel,
   wherein the power supply terminal is arranged at a third position between the first position and the second position, at which the wire winds around the multiple main rollers in parallel,
   wherein the machining voltage is supplied from the machining power supply unit to the workpieces to be electrically discharge machined by the multiple workpiece feeding units, and
   wherein the third position at which the power supply terminal is arranged is configured to be capable of being changed to a position at which a first distance between the first position and the third position of the wire winding around the multiple main rollers in parallel and a second distance between the second position and the third position of the wire winding around the multiple main rollers in parallel become equal to each other, when workpieces having substantially the same resistivity value measured in advance prior to the electrical discharge machining are electrically discharge machined respectively by the multiple workpiece feeding units.

2. A wire electrical discharge machining apparatus according to claim 1, further comprising a driving unit arranged to change the third position at which the power supply terminal is arranged,
   wherein, when the workpieces having substantially the same resistivity value measured in advance prior to the electrical discharge machining are electrically discharge machined respectively by the multiple workpiece feeding units, the driving unit moves the power supply terminal so that the first distance and the second distance become equal to each other.

3. A wire electrical discharge machining apparatus according to claim 1, wherein the third position at which the power supply terminal is arranged is configured to be capable of being changed to a position at which one of a ratio and a difference between the first distance and the second distance becomes a value determined based on one of a ratio and a difference between the resistivity values measured in advance, when workpieces having different resistivity values measured in advance prior to the electrical discharge machining are electrically discharge machined respectively by the multiple workpiece feeding units.

4. A wire electrical discharge machining apparatus according to claim 3, further comprising a driving unit arranged to change the third position at which the power supply terminal is arranged, wherein, when the workpieces having different resistivity values measured in advance prior to the electrical discharge machining are electrically discharge machined respectively by the multiple workpiece feeding units, the driving unit moves the power supply terminal so that one of the ratio and the difference between the first distance and the second distance becomes the value determined based on one of the ratio and the difference between the resistivity values measured in advance.

5. A wire electrical discharge machining apparatus according to claim 3, wherein, the power supply terminal is arranged at a position close to the workpiece having a higher resistivity value measured in advance to perform the electrical discharge machining.

6. A wire electrical discharge machining apparatus according to claim 1,
   wherein the power supply terminals are arranged at multiple positions of the wire winding around the multiple main rollers, and
   wherein the multiple workpiece feeding units are respectively arranged at positions that equally divide a running distance of the wire winding around the multiple main rollers.

7. A wire electrical discharge machining apparatus according to claim 1,
   wherein the power supply terminals are arranged at multiple positions of the wire winding around the multiple main rollers,
   wherein a number of the power supply terminals and a number of the workpiece feeding units, which are arranged along the wire winding around the multiple main rollers in parallel, are equal to each other, and
   wherein the multiple power supply terminals and the workpiece feeding units arranged at the multiple positions are alternately arranged one by one along the wire winding around the multiple main rollers in parallel.

8. A wire electrical discharge machining system for electrical discharge machining of a workpiece, comprising:
a wire electrical discharge machining apparatus comprising:
multiple main rollers around which a wire winds in parallel;
multiple workpiece feeding units arranged to feed the workpiece toward the wire winding around the multiple main rollers; and
a power supply terminal configured to supply a machining voltage to the wire winding around the multiple main rollers; and
a power supply apparatus comprising a machining power supply unit configured to supply the machining voltage to the workpiece,
wherein the multiple workpiece feeding units are respectively arranged at a first position at which the workpiece is fed to a wire portion having a wire plane of the wire winding around the multiple main rollers in parallel and a second position at which another workpiece is fed to another wire portion having another wire plane of the wire winding around the multiple main rollers in parallel,
wherein the power supply terminal is arranged at a third position between the first position and the second position, at which the wire winds around the multiple main rollers in parallel,
wherein the machining voltage supplied from the machining power supply unit is supplied to the workpieces to be electrically discharge machined by the multiple workpiece feeding units, and
wherein the third position at which the power supply terminal is arranged is configured to be capable of being changed to a position at which a first distance between the first position and the third position of the wire winding around the multiple main rollers in parallel and a second distance between the second position and the third position of the wire winding around the multiple main rollers in parallel become equal to each other, when workpieces having substantially the same resistivity value measured in advance prior to the electrical discharge machining are electrically discharge machined respectively by the multiple workpiece feeding units.

9. A power supply apparatus to be used for a wire electrical discharge machining apparatus for electrical discharge machining of a workpiece, the wire electrical discharge machining apparatus comprising:
multiple main rollers around which a wire winds in parallel;
multiple workpiece feeding units arranged to feed the workpiece toward the wire winding around the multiple main rollers; and
a power supply terminal configured to supply a machining voltage to the wire winding around the multiple main rollers,
the multiple workpiece feeding units being respectively arranged at a first position at which the workpiece is fed to a wire portion having a wire plane of the wire winding around the multiple main rollers in parallel and a second position at which another workpiece is fed to another wire portion having another wire plane of the wire winding around the multiple main rollers in parallel, the power supply terminal being arranged at a third position between the first position and the second position, at which the wire winds around the multiple main rollers in parallel,
the power supply apparatus comprising a machining power supply unit configured to supply the machining voltage to the workpiece to be electrically discharge machined in the wire electrical discharge machining apparatus,
wherein the machining voltage supplied from the machining power supply unit is supplied to the workpieces to be electrically discharge machined by the multiple workpiece feeding units, and
wherein the third position at which the power supply terminal is arranged is configured to be capable of being changed to a position at which a first distance between the first position and the third position of the wire winding around the multiple main rollers in parallel and a second distance between the second position and the third position of the wire winding around the multiple main rollers in parallel become equal to each other, when workpieces having substantially the same resistivity value measured in advance prior to the electrical discharge machining are electrically discharge machined respectively by the multiple workpiece feeding units.

10. A wire electrical discharge machining method for a wire electrical discharge machining apparatus for electrical discharge machining of a workpiece, the wire electrical discharge machining method comprising:
supplying, by a machining power supply unit, a machining voltage to the workpiece;
supplying, by a power supply terminal, the machining voltage to a wire winding around multiple main rollers in parallel; and
feeding, by multiple workpiece feeding units, the workpiece toward the wire winding around the multiple main rollers in parallel,
the multiple workpiece feeding units being respectively arranged at a first position at which the workpiece is fed toward a wire portion having a wire plane of the wire winding around the multiple main rollers in parallel and a second position at which another workpiece is fed toward another wire portion of another wire plane of the wire winding around the multiple main rollers in parallel,
the power supply terminal being arranged at a third position between the first position and the second position, at which the wire winds around the multiple main rollers in parallel,
the machining voltage being supplied from the machining power supply unit to the workpieces to be electrically discharge machined by the multiple workpiece feeding units, and
wherein the third position at which the power supply terminal is arranged is configured to be capable of being changed to a position at which a first distance between the first position and the third position of the wire winding around the multiple main rollers in parallel and a second distance between the second position and the third position of the wire winding around the multiple main rollers in parallel become equal to each other, when workpieces having substantially the same resistivity value measured in advance prior to the electrical discharge machining are electrically discharge machined respectively by the multiple workpiece feeding units.

11. A method of manufacturing a semiconductor substrate subjected to electrical discharge machining by a wire electrical discharge machining apparatus for electrical discharge machining of a workpiece, the method comprising:

supplying, by a machining power supply unit, a machining voltage to the workpiece;

supplying, by a power supply terminal, the machining voltage to a wire winding around multiple main rollers in parallel; and feeding, by multiple workpiece feeding units, the workpiece toward the wire winding around the multiple main rollers in parallel, the multiple workpiece feeding units being respectively arranged at a first position at which the workpiece is fed toward a wire portion having a wire plane of the wire winding around the multiple main rollers in parallel and a second position at which another workpiece is fed toward another wire portion of another wire plane of the wire winding around the multiple main rollers in parallel, the power supply terminal being arranged at a third position between the first position and the second position, at which the wire winds around the multiple main rollers in parallel, the machining voltage being supplied from the machining power supply unit to the workpieces to be electrically discharge machined by the multiple workpiece feeding units, and wherein the third position at which the power supply terminal is arranged is configured to be capable of being changed to a position at which a first distance between the first position and the third position of the wire winding around the multiple main rollers in parallel and a second distance between the second position and the third position of the wire winding around the multiple main rollers in parallel become equal to each other, when workpieces having substantially the same resistivity value measured in advance prior to the electrical discharge machining are electrically discharge machined respectively by the multiple workpiece feeding units.

* * * * *